(12) United States Patent
Correa et al.

(10) Patent No.: US 7,053,576 B2
(45) Date of Patent: May 30, 2006

(54) ENERGY CONVERSION SYSTEMS

(76) Inventors: Paulo N. Correa, 42 Rockview Gardens, Concord, Ontario (CA) L4K 2J6; Alexandra N. Correa, 42 Rockview Gardens, Concord, Ontario (CA) L4K 2J6

( * ) Notice: Subject to any disclaimer, the term of this patent is extended or adjusted under 35 U.S.C. 154(b) by 0 days.

(21) Appl. No.: 10/270,154

(22) Filed: Oct. 15, 2002

(65) Prior Publication Data

US 2006/0082334 A1    Apr. 20, 2006

Related U.S. Application Data

(63) Continuation of application No. 09/907,823, filed on Jul. 19, 2001, now abandoned.

(51) Int. Cl.
*H05B 31/48* (2006.01)

(52) U.S. Cl. .................................. 318/558; 315/111.21

(58) Field of Classification Search ................ 310/308, 310/309; 318/558; 315/111.01, 111.21, 315/111.31
See application file for complete search history.

(56) References Cited

U.S. PATENT DOCUMENTS

| | | | |
|---|---|---|---|
| 433,702 A | | 8/1890 | Telsa |
| 645,576 A | | 3/1900 | Telsa |
| 3,233,157 A | * | 2/1966 | Stockman .................. 318/116 |
| 4,095,118 A | * | 6/1978 | Rathbun ...................... 290/2 |
| 4,213,797 A | * | 7/1980 | Sher .......................... 136/254 |
| 4,473,736 A | * | 9/1984 | Bloyet et al. ........... 219/121.48 |
| 5,063,330 A | * | 11/1991 | Leprince et al. .......... 315/111.21 |
| 5,416,391 A | | 5/1995 | Correa et al. |
| 5,449,989 A | | 9/1995 | Correa et al. |
| 6,271,614 B1 | * | 8/2001 | Arnold ....................... 310/233 |

OTHER PUBLICATIONS

Kuhn, T.S. (1978) "Black-body Theory and the Quantum Discontinuity, 1898-1912", The University of Chicago Press, pp. 246-249, 289-290.
Wang, LJ et al (2000) "Gain-assisted superluminal light propagation", Nature, 406:277.
Martin, Thomas Commerfold (1894) "The Inventions, Researches and Writlngs of Nikola Tesla", The Electrical Engineer, New York, p. 68.
Tesla, Nikola (1956) "Lectures, Patents, Articles", Nikola Tesla Museum, Beograd, Yugolsavia, L-70-71 & L-130-132 ( Figure 16.II).

(Continued)

*Primary Examiner*—Bentsu Ro
(74) *Attorney, Agent, or Firm*—Ridout & Maybee LLP

(57) ABSTRACT

This invention relates to apparatus for the conversion of massfree energy into electrical or kinetic energy, which uses in its preferred form a transmitter and a receiver both incorporating Tesla coils, the distal ends of whose secondary windings are co-resonant and connected to plates of a chamber, preferably evacuated or filled with water, such that energy radiated by the transmitter may be picked up by the receiver, the receiver preferably further including a pulsed plasma reactor driven by the receiver coil and a split phase motor driven by the reactor. Preferably the reactor operates in pulsed abnormal gas discharge mode, and the motor is an inertially damped drag motor. The invention also extends to apparatus in which an otherwise driven plasma reactor operating in pulsed abnormal gas discharge mode in turn used to drive an inertially damped drag motor.

16 Claims, 11 Drawing Sheets

OTHER PUBLICATIONS

Reich, Wilhelm (1949) "A Motor Force in Orgone Energy. Preliminary Communications", Orgone Energy Bulletin, vol. 1, #1, pp. 7-11.

Laithwaite, Eric (1957) "Induction Machines for Special Purposes". p. 322-323.

Halliday, David & Resnick, Robert (1978)"Physics", Parts I and II Combined Third Edition, John Wiley and Sons, p. 488-489.

* cited by examiner

ENERGY CONVERSION SYSTEMS

This is a continuation of application Ser. No. 09/907,823, filed Jul. 19, 2001 now abandoned.

FIELD OF THE INVENTION

This invention relates to systems for the conversion of energy, inter alia in the form of what we will refer to for convenience as Tesla waves (see below), to conventional electrical energy.

BACKGROUND OF THE INVENTION

Energy converters that are fed by local or environmental energy are usually explained by taking recourse to the notion that they convert zero point electromagnetic radiation (ZPE) to electric energy. The ZPE theories have gained a life of their own, as T. Kuhn has pointed out (in his "Black Body Theory and the Quantum"), after emerging from Planck's second theory, specifically from the term ½ hυ in the new formula for oscillator energy. In 1913, Einstein and Stern suggested that motional frequencies contributing to specific heat fell into two categories—those that were independent of temperature and those that were not (e.g. rotational energy), leading them to conclude that zero-point energy on the order of ½ hυ was most likely. In the second part of their paper, however, they provided a derivation of Planck's Law without taking recourse to discontinuity, by assuming that the value of the ZPE was simply hυ. It is worth noting that Einstein had already in 1905 ("Erzeugung und Verwandlung des Lichtes betreffenden heuristichen Gesichtspunkt", Ann. d. Phys, 17, 132) framed the problem of discontinuity, even if only heuristically, as one of placing limits upon the infinite energy of the vacuum state raised by the Rayleigh-Jeans dispersion law. According to Einstein, the Rayleigh-Jeans law would result in an impossibility, the existence of infinite energy in the radiation field, and this was precisely incompatible with Planck's discovery—which suggested instead that at high frequencies the entropy of waves was replaced by the entropy of particles. Einstein, therefore, could only hope for a stochastic validation of Maxwell's equations at high frequencies "by supposing that electromagnetic theory yields correct time-average values of field quantities", and went on to assert that the vibration-energy of high frequency resonators is exclusively discontinuous (integral multiples of hυ).

Since then, ZPE theories have gone on a course independent from Planck's second theory. The more recent root of modern ZPE theories stems from the work of H. Casimir who, in 1948, apparently showed the existence of a force acting between two uncharged parallel plates. Fundamentally the Casimir effect is predicated upon the existence of a background field of energy permeating even the 'vacuum', which exerts a radiation pressure, homogeneously and from all directions in space, on every body bathed in it. Given two bodies or particles in proximity, they shield one another from this background radiation spectrum along the axis (i.e. the shortest distance) of their coupling, such that the radiation pressure on the facing surfaces of the two objects would be less than the radiation pressure experienced by all other surfaces and coming from all other directions in space. Under these conditions, the two objects are effectively pushed towards one another as if by an attractive force. As the distance separating the two objects diminishes, the force pushing them together increases until they collapse one onto the other. In this sense, the Casimir effect would be the macroscopic analogy of the microscopic van der Waals forces of attraction responsible for such dipole-dipole interactions as hydrogen bonding. However, it is worth noting that the van der Waals force is said to tend to establish its normal radius, or the optimal distance between dipoles, as the distance where the greatest attractive force is exerted, beyond which the van der Waals forces of nuclear and electronic repulsion overtake the attraction force.

Subsequently, another Dutch physicist, M. Sparnaay, demonstrated that the Casimir force did not arise from thermal radiation and, in 1958, went on to attribute this force to the differential of radiation pressure between the ZPE radiation from the vacuum state surrounding the plates and the ZPE radiation present in the space between them. Sparnaay's proposal is that a classical, nonquantal, isotropic and ubiquitous electromagnetic zero-point energy exists in the vacuum, and even at a temperature of absolute zero. It is further assumed that since the ZPE radiation is invariant with respect to the Lorentz transformations, it obeys the rule that the intensity of its radiation is proportional to the cube of the frequency, resulting in an infinite energy density for its radiation spectrum.

What appeared to be the virtue of this reformulated theory was the notion that the vacuum no longer figured as pure space empty of energy, but rather as a space exposed to constantly fluctuating 'fields of electromagnetic energy'.

Puthoff has utilized the isomorphism between van der Waals and Casimir forces to put forth the zero-point (ZP) energy theory of gravity, based on the interpretation that the virtual electromagnetic ZP field spectrum predicted by quantum electrodynamics (QED) is functionally equivalent to an actual vacuum state defined as a background of classical or Maxwellian electromagnetic radiation of random phases, and thus can be treated by stochastic electrodynamics (SED). Whereas in QED, the quanta are taken as virtual entities and the infinite energy of the vacuum has no physical reality, for SED, the ZPE spectrum results from the distortion of a real physical field and does not require particle creation. Gravity then, could be seen as but the macroscopic manifestation of the Casimir force.

We do not dispute the fact that even in space absent matter there is radiant energy present which is not of a thermal nature. But we claim that this energy is not electromagnetic, nor is its energy spectrum infinite. That this is so stems not just from our opinion that it is high time that Einstein's heuristic hypothesis should be taken as literally factual—in the dual sense that all electromagnetic energy is photon energy and all photons are local productions, but above all from the fact that it is apparent, from the experiments of Wang and his colleagues (Wang, Li, Kuzmich, A & Dogariu, A. "Gain-assisted superluminal light propagation", Nature 406; #6793; 277), that the photon stimulus can propagate at supraluminal speeds and lies therefore well outside of any scope of electromagnetic theory, be this Maxwell's classical approach taken up by ZPE theories, or Einstein's special relativistic phenomenology of Maxwell's theory. The fact is that if the light stimulus can propagate at speeds greater than those of light, then what propagates is not light at all, and thus not energy configured electromagnetically. Light is solely a local production of photons in response to the propagation of a stimulus that itself is not electromagnetic.

It is critical to understand that the implication from this that—aside from local electromagnetic radiation and from thermal radiation associated with the motions of molecules (thermo-mechanical energy), there is at least another form of energy radiation which is everywhere present, even in space absent matter. Undoubtedly, it is that energy that prevents any attainment of absolute zero, for any possible local outpumping of heat is matched by an immediate local conversion of some of this energy into a minimum thermal radiation required by the manifolds of Space and Time. And undoubtedly also this radiation is ubiquitous and not subject to relativistic transformations (i.e. Lorentz invariant). What it is not, is electromagnetic radiation consisting of randomistic phases of transverse waves.

To understand this properly, one must summarize the differences from existing ZPE theories—and all these differences come down to the fact that this energy which is neither electromagnetic nor thermal per se (and is certainly not merely thermo-mechanical), has nevertheless identifiable characteristics both distributed across subtypes or variants and as well common to all of them.

Essentially the first subtype or variant consists of longitudinal massfree waves that deploy electric energy. They could well be called Tesla waves, since Tesla-type transformers can indeed be shown experimentally to radiate massfree electric energy, in the form of longitudinal magnetic and electric waves having properties not reduceable to photon energy or to 'electromagnetic waves', and having speeds of displacement that can be much greater than the limit c for all strictly electromagnetic interactions.

One may well denote the second subtype by the designation of massfree thermal radiation, since it contributes to temperature changes—and, as obviously indicated by the impossibility of reaching an absolute zero of temperature, this contribution occurs independently of the presence of matter, or mass-energy, in Space. In other words, not all thermal radiation can be reduced to vibration, rotation and translation (drift motion) of molecules, i.e. to thermomechanical energy, because the properties of pressure and volume that determine temperature and affect matter, appear indeed to a great extent to be independent from matter, a fact which itself is responsible for the observed catastrophic and unexpected phase changes of matter and has required to this day the insufficient explanation offered semi-empirically by the Van der Waals Force Law.

Finally the third subtype may be designated latent massfree energy radiation—since it deploys neither charge, nor thermal or baroscopic effects, and yet it is responsible for 'true latent heat' or for the 'intrinsic potential energy' of a molecule. It is also responsible for the kinetoregenerative phenomenon whereby an electroscope performs a variable charge-mediated work against the local gravitational field.

The common characteristic of all three subtypes of massfree energy radiation is that they share the same nonclassical fine structure, written as follows for any energy unit, where c is any speed of light wave function, and the wavelength $\lambda$ and wave function W are interconnected as a function of the physical quality of the energy field under consideration:

$$E = \lambda c W$$

In the instance of longitudinal electric radiation, this takes on the directly quantizable form:

$$E = (\lambda_q c) W_v = p_e W_v = (h/\lambda_x) W_v = \int = q_v$$

where $W_v$ is the voltage-equivalent wave function corresponding to V, $P_e$ constitutes the linear momentum corresponding to the conventional q or e, h is the Planck constant, $\lambda_x$ the Duane-Hunt constant expressed as a wavelength, $\lambda_q$ is a wavelength constant; and the sign=$\int$=signifies exact equality between an expression in the conventional dimensions of length, mass and time, and an expression in length and time dimensions alone.

In the instance of massfree thermal radiation (contributing to temperature changes), the transformation obeys Boltzmann's rule (k is now Boltzmann's constant and T is Kelvin-scale temperature):

$$E = \lambda_{n1} c W_{n1} = \lambda_{n1} (\lambda_v \zeta_p)(\lambda_{c_l} \zeta_{n1}) = \int = kT$$

and in the third instance—of latent massfree radiation, the transformation obeys the rule:

$$E = \lambda_{n1} c W_{n1} = \lambda_{n1} (\lambda_{n1} \zeta_{n1})(\lambda_{n1} f_{n1}) = \lambda_{n1}^3 \zeta_{n1} f_{n1}$$

where $\zeta$ and f are frequency functions, f being a specific gravitational frequency term, and $f_{n1}$ being defined as equal to $(\lambda_{n1})^{-0.5}$ meter$^{0.5}$sec$^{-1}$. $\zeta_{n1}$ has the value of $c/\lambda_{n1}$.

If the electric variant of massfree radiation has a direct quantum equivalence, via the Duane-Hunt Law, none of the three primary aether energy variants possess either the classic form of electromagnetic energy which requires square superimposition of speed of light wave functions c, as $c^2$, or the quantum form of energy, requiring $E=h\upsilon$. The critical first step in the right direction may well be attributed to Dr. W. Reich, as it regards the fact that massfree energy couples two unequal wave functions, only one of which is electromagnetic and abides by the limit c. We then unravelled the threefold structure described above, and further showed that, in the case of longitudinal electric waves, the postulated equivalence ($q = \lambda_q c$) is merely phenomenological, as these waves are not restricted by the function c in their conveying of electric charge across space. It can further be demonstrated that all blackbody photons are bound by an upper frequency limit ($64*10^{14}$ Hz), above which only ionizing photons are produced, and that all blackbody photons arise precisely from the interaction of massfree electric radiation with molecules of matter (including light leptons), whereby the energy of that radiation is locally converted into photon or electromagnetic radiation. In other words, all nonionizing electromagnetic energy appears to be secondary energy that results locally from the interaction of matter with massfree electric energy. It cannot therefore consist of the primary energy that is present in the vacuum, an energy that is neither virtual nor electromagnetic, but actual and concrete in its electric, thermal and antigravitic manifestations. Lastly, gravitational energy, being either the potential or the kinetic energy responsible for the force of attraction between units of matter, is a manifestation that also requires, much as electromagnetic radiation does, coupling of massfree energy to matter or to mass-energy.

The Tesla coil is a generator of a massfree electric energy flux that it transmits both by conduction through the atmosphere and by conduction through the ground. Tesla thought it did just that, but it has been since regarded instead (because of Maxwell, Hertz and Marconi) as a transmitter of electromagnetic energy. The transmitter operates by a consumption of massbound electric power in the primary, and by induction it generates in the coupled secondary two electric fluxes, one massbound in the coil conductor, and the other massfree in the body of the solenoid. Tesla also proposed and demonstrated a receiver for the massfree energy flux in the form of a second Tesla coil resonant with the first. The receiver coil must be identical and tuned to the transmitter coil; the capacitance of the antenna plate must match that of the transmitter plate; both transmitter and receiver coils must be grounded; and the receiver coil input and output must be unipolar, as if the coil were wired in series.

The generators of massfree energy with which we are concerned provide current pulses associated with a damped wave (DW) oscillation of much higher frequency than the pulse repetition frequency. A particular problem in recovering the massfree energy content of such pulses is provided by the damped wave oscillations. Although in our U.S. Pat. No. 5,416,391 we describe arrangements incorporating split phase motors to recover such energy, their efficiency is a great deal less than what should theoretically be attainable. Other workers such as Tesla and Reich, have encountered the same problem to an even greater degree.

In XIXth century motor engineering terminology, dynamos capable of producing direct current by continuous homopolar induction were known as 'unipolar' generators. The term unipolar induction appears to have originated with W. Weber, to designate homopolar machines where the conductor moves continuously to cut the magnetic lines of one kind of magnetic pole only, and thus require sliding contacts to collect the generated current. Faraday's rotating copper disc apparatus was, in this sense, a homopolar generator when the disc was driven manually, or a homopolar motor when the current was provided to it. Where the rotating conductor continuously cuts the magnetic field of alternatingly opposite magnetic poles, the operation of a machine, whether a generator or a motor, is said to be heteropolar. Unipolar machines went on to have a life of their own in the form of low voltage and high current DC generators—from Faraday, through Plucker, Varley, Siemens, Ferraris, Hummel, to Lord Kelvin, Pancinoti, Tesla and others—almost exclusively in the form of disc dynamos, but some having Wound rotors. In Mordey's alternator, and in so-called 'inductor alternators', however, homopolar generators were employed to obtain alternating currents, with the use of rotors wound back and forth across the field. Use of smooth, unwound rotors in AC induction motors (as opposed to AC synchronous motors, such as hysteresis motors) was a later development than homopolar dynamos. By 1888, Tesla and Ferraris amongst still others, had independently produced rotating magnetic fields in a motor, by employing two separate alternate currents with the same frequency but different phase. Single phase alternate current motors were developed later, and split-phase motors were developed last. Ferraris (Ferraris, G (1888) "Rotazioni elettrodynamiche", Turin Acad, March issue.) proposed the elementary theory of the 2-phase motor, where the current induced in the rotor is proportional to the slip (the difference between the angular velocity of the magnetic field and that of the rotating cylinder), and the power of the motor is proportional to both the slip and the velocity of the rotor.

If an iron rotor is placed within the rotating magnetic field of a 2-phase stator, it will be set in rotation, but not synchronously, given that it is always attracted to the moving magnetic poles with a lag. But if an aluminum or copper rotor is used instead, it becomes 'dragged' around by the rotating stator field because of the eddy currents induced in it. If the aluminum or copper rotor were to rotate synchronously with the stator magnetic field, there would be no induced eddy currents and thus no motor action would result. The motor action depends, in this instance, upon the presence of asynchronous slip, since the function of the latter is to sustain the induction of those currents in the rotor that are responsible for the motor action of the dragged rotor. This then is the origin of the term 'AC drag motors'. Once the drag rotor evolved from a cylinder to a hollow cup, they earned the epithet of 'drag-cup motors'. Later, already in the XXth century, the cups were fitted over a central stator member, and the sleeve rotor 2 phase servomotor was born.

Tesla knew that impulse currents as well as CW sinusoidal currents could be used to drive AC motors. Regarding his invention of an hysteresis motor ('magnetic lag motor', as he called it), he stated: " . . . pulsatory as well as an alternating current might be used to drive the[se] motors . . . " (Martin, TC (1894) "The inventions, researches and writings of Nikola Tesla", Chapter XII, p. 68). In his search for efficient utilization of the high frequency DW impulse currents of his induction coils, Tesla began by employing an AC disc induction motor as shown in FIG. 17 of his famous 1892 address (Tesla, N (1892) "Experiments with alternate currents of high potential and high frequency", in "Nikola Tesla Lectures", 1956, Beograd, pp. L-70–71). This consisted of a copper or aluminum disc mounted vertically along the longitudinal axis of an iron core on which was wound a single motor coil which was series wired to the distal terminal of an induction coil at one end, and to a large suspended and insulated metal plate at the other. What was new about this was the implementation of an AC disc induction motor drive, where the exciting current traveled directly through the winding with just a unipolar connection to the coil secondary (under certain conditions, even the series connection to the plate could be removed, or replaced with a direct connection to the experimenter's body): "What I wish to show you is that this motor rotates with one single connection between it and the generator" (Tesla, N. (1892), op. cit., L-70, Tesla's emphasis). Indeed, he had just made a critical discovery that, unlike in the case of massbound charge where current flow requires depolarization of a bipolar tension, massfree charge engages current flow unipolarly as a mere matter of proper phase synchronization.

Tesla thought that his motor was particularly adequate to respond to windings that had 'high-self-induction', such as a single coil wound on an iron core. The basis of this self-induction is the magnetic reaction of a circuit, or an element of a circuit—an inductor—whereby it chokes, dims or dampens the amplitude of electric waves and retards their phase.

For the motor to respond to still higher frequencies, one needed to wind over the primary motor winding a partial overlap secondary, closed through a capacitor, since "it is not at all easy to obtain rotation with excessive frequencies, as the secondary cuts off almost completely the lines of the primary" (Idem, L-71.).

Tesla stated that "an additional feature of interest about this motor" was that one could run it with a single connection to the earth ground, although in fact one end of the motor primary coil had to remain connected to the large, suspended metal plate, placed so as to receive or be bathed by "an alternating electrostatic field", while the other end was taken to ground. Thus Tesla had an ordinary induction coil that transmitted this "alternating electrostatic field", an untuned Tesla antenna receiving this "field", and a receiver circuit comprising his iron-core wound motor primary, a closely coupled, capacitatively closed secondary, and the coupled nonferromagnetic disc rotor. Eventually, in his power transmission system, he would replace this transmitter with a Tesla coil, and place an identical receiving coil at the receiving end, to tune both systems and bring them into resonance. But his motor remained undeveloped, and so did the entire receiver system.

Tesla returned to this subject a year later: "on a former occasion I have described a simple form of motor comprising a single exciting coil, an iron core and disc" (Tesla, N (1893) "On light and other high frequency phenomena", in "Nikola Tesla Lectures", 1956, Beograd, pp. L-130, and L-131 with respect to FIG. 16-II). He describes how he developed a variety of ways to operate such AC motors unipolarly from an induction transformer, and as well other arrangements for "operating a certain class of alternating motors founded on the action of currents of differing phase". Here, the connection to the induction transformer is altered so that the motor primary is driven from the coarse secondary of a transformer, whose finer primary is coupled, at one end, directly and with a single wire to the Tesla secondary, and at the other left unconnected. On this occasion, Tesla mentions that such a motor has been called a 'magnetic lag motor', but that this expression (which, incidentally, he had himself applied to his own invention of magnetic hysteresis motors) is objected to by "those who attribute the rotation of the disc to eddy currents when the core is finally subdivided" (Tesla,N (1893), op. cit., p. L-130).

In none of the other motor solutions, 2-phase or split-phase, that he suggests as unipolar couplings to the secondary of an induction coil, does the nonferromagnetic disc rotor motor again figure. But he returns to it a page later, and indirectly so, by first addressing the disadvantages of ferromagnetic rotors: "Very high frequencies are of course not practicable with motors on account of the necessity of employing iron cores. But one may use sudden discharges of low frequency and thus obtain certain advantages of high-frequency currents-without rendering the iron core entirely incapable of following the changes and without entailing a very great expenditure of energy in the core. I have found it quite practicable to operate, with such low frequency disruptive discharges of condensers, alternating-current motors."

In other words—whereas his experiments with constant wave (CW) alternating currents, and as well with high-voltage DW impulses from induction coils, indicated the existence of an upper frequency limit to iron core motor performance, one might employ instead high-current, DW impulses—of high DW frequencies but low impulse rates—to move these motors quite efficiently. Then he adds "A certain class of [AC] motors which I advanced a few years ago, that contain closed secondary circuits, will rotate quite vigorously when the discharges are directed through the exciting coils [emphasis added]. One reason that such a motor operates so well with these discharges is that the difference of phase between the primary and secondary currents is 90 degrees, which is generally not the case with harmonically rising and falling currents of low frequency. It might not be without interest to show an experiment with a simple motor of this kind, inasmuch as it is commonly thought that disruptive discharges are unsuitable for such purposes."

What he proposes next forms the basis of modern residential and industrial AC electric power meters, the AC copper disc motor whose rotor turns on the window of these meters, propelled forward by the supply frequency. But instead of employing any such CW input, Tesla uses the disruptive discharges of condensers, incipiently operating as current rectifiers. With the proper conditions, e.g. correct voltage from the generator, adequate current from the capacitor, optimum capacitance for the firing rate, and tuned spark-gap, to mention a few, Tesla found that the nonferromagnetic disc rotor turned but with considerable effort. But this hardly compared to the results obtained with a high-frequency CW alternator, which could drive the disc "with a much smaller effort". In summary then, Tesla went as far as being the first to devise a motor driven by Tesla waves, that employed a nonferromagnetic rotor, and whose arrangement encompassed both transmitter and receiver circuits. For this purpose, he employed a single phase method in which the signal is fed unipolarly to the winding, placed in series with a plate capacitance.

Tesla also later proposed driving a similar single-phase nonferromagnetic disc motor from bipolar capacitative discharges through an atmospheric spark-gap now placed in parallel with the main motor winding, and again simulating a split-phase by a closely wound secondary that was closed by a capacitance.

As Tesla admits, the results of all his AC eddy current motor solutions were meagre and limited by current and frequency problems. Likewise, the two phase arrangements proposed by Reich for his OR motor, involving a superimposition of the damped waves of a first phase on a fixed continuous wave second phase, require an external power source and a pulse amplifier circuit, and failed to meet Reich's own desiderata.

We have previously proposed the use of squirrel cage motors with capacitative splitting of phase to convert the damped wave (DW) output of plasma pulsers, but once a squirrel cage (SC) is introduced, the dampening effect which the nonferromagnetic copper cage exerts in being dragged by the revolving stator field is counteracted by the ferromagnetic cylinder of laminated iron, in which the copper cage is embedded, working to diminish the slip and bring the rotor to near synchronism. This is, in all likelihood, what limits SC motors to responding to the DC component of the DW impulse, and thus be limited to respond to fluxes of massbound charges. Historically, as we shall see, the obvious advantage of the SC servomotors lay in the fact that, in particular for 2-phase applications, they were far more efficient at performing work without evolution of heat. Indeed, if the eddy currents in the nonferromagnetic rotor are permitted to circulate in nonordered form, the rotor material and stator will heat up rapidly and consume much power in that heating. This is in fact considered to be a weakness of AC nonferromagnetic-rotor induction motors.

SUMMARY OF THE INVENTION

The present invention is concerned with conversion to conventional electrical energy of the variants of massfree energy radiation considered above, referred to for convenience as Tesla waves, massfree thermal radiation and latent massfree radiation. The first variant of such radiation was recognized, generated and at least partially disclosed by Tesla about a hundred years ago, although his work has been widely misinterpreted and also confused with his work on the transmission of radio or electromagnetic waves. The Tesla coil is a convenient generator of such radiation, and is used as such in many of the embodiments of our invention described below, but it should be clearly understood that our invention in its broadest sense is not restricted to the use of such a coil as a source of massfree radiation and any natural or artificial source may be utilized. For example, the sun is a natural source of such radiation, although interaction with the atmosphere means that it is largely unavailable at the earth's surface, limiting applications to locations outside of the earth's atmosphere.

According to the invention, a device for the conversion of massfree radiation (as herein defined) into electrical or mechanical energy comprises a transmitter of massfree electrical radiation having a damped wave component, a receiver of such radiation tuned to resonance with the damped wave frequency of the transmitter, a co-resonant output circuit coupled into and extracting electrical or kinetic energy from the receiver, and at least one of structure defining a transmission cavity between the transmitter and the receiver, a full-wave rectifier in the co-resonant output circuit, and an oscillatory pulsed plasma discharge device incorporated in the co-resonant output circuit. The output circuit preferably comprises a full wave rectifier presenting a capacitance to the receiver, or an electric motor, preferably a split phase motor, presenting inductance to the receiver. The transmitter and receiver each preferably comprise a Tesla coil and/or an autogenous pulsed abnormal glow discharge device. The transmission cavity is preferably at least partially evacuated, and comprises spaced plates connected respectively to the distal poles of the secondaries of Tesla coils incorporated in the transmitter and receiver respectively, the plates being parallel or concentric. The structure defining the cavity may be immersed in ion-containing water. The split-phase motor is preferably an inertially damped AC drag motor.

The invention, and experiments demonstrating its basis, are described further below with reference to the accompanying drawings.

SHORT DESCRIPTION OF THE DRAWINGS

DESCRIPTION OF THE PREFERRED EMBODIMENTS

Based upon observations of weight loss in metallic matter as induced by exposure to high frequency alternating electric fields, we developed an experimental method to optimize this weight loss, and from this a device that treats the forces causing weight loss as manifestations of intrinsic potential energy $\Delta U$ (or true "latent heat") of the molecules of matter, and converts both "true latent heat" energy present in the neighbourhood of a receiver, and "sensible" heat induced within that receiver, into electric energy that can be employed to drive a motor, flywheel or charge battery supplies.

It is commonly believed that the output of the Tesla coil is ionizing electromagnetic radiation. We have demonstrated that it is not; i.e. that it is neither electromagnetic radiation, nor ionizing electromagnetic radiation. The output of an air cored, sequentially-wound secondary, consists exclusively of electric energy: upon contact with the coil, a massbound AC current can be extracted at the resonant frequency, whilst across a non-sparking gap, massfree AC-like electric wave radiation having the characteristics of longitudinal waves, can be intercepted anywhere in adjacent space. Accordingly, the radiation output from such coils is distinct from electromagnetic radiation.

Figure 1:
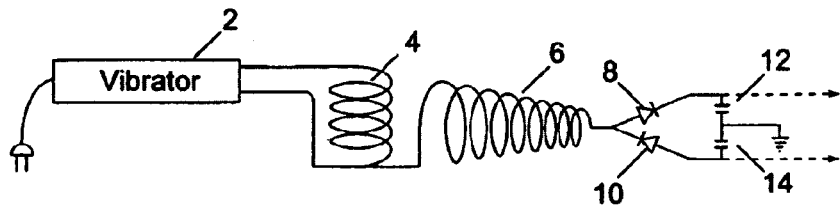
FIG. 1 is a schematic view of a Tesla coil connected to a full-wave rectifier to form an energy conversion device.

The basic demonstration that the output of a Tesla coil does not consist of ionizing radiation is that it does not accelerate the spontaneous discharge rate of electroscopes, whether positively or negatively charged. In fact, in its immediate periphery, the coil only accelerates the spontaneous discharge rate of the negatively charged electroscope (i.e. the charge leakage rate), whereas it arrests the discharge of the positively charged electroscope (i.e. the charge seepage rate falls to zero). But this dual effect is not due to any emission of positive ions from the secondary, even if it can positively charge a discharged electroscope brought to its proximity. This charging effect is in fact an artifact, in that metals but not dielectrics are ready to lose their conduction and outer valence band electrons when exposed to the massfree electric radiation of the coil. This is simply demonstrated by the apparatus of FIG. 1, in which the distal terminal of the secondary winding 6 of a Tesla coil having a primary winding 4 driven by a vibrator 2 is connected to the input of a full-wave voltage wave divider formed by diodes 8 & 10 and reservoir capacitors 12 & 14 (the same reference numerals are used for similar parts in subsequent Figures). If the rectifiers employed are nondoped, the coil appears to only charge the divider at the positive capacitance 10, but if doped rectifiers are employed, the coil will be observed to charge both capacitances equally. Whereas positive ionizers can charge either doped or undoped dividers positively, no positive ionizer can charge a doped divider negatively, clearly demonstrating that the Tesla coil does not emit positive ions.

The basic demonstration that the output of a Tesla coil is not nonionizing electromagnetic radiation of high frequency, such as optical radiation, or of lower frequency, such as thermal photons, is also a simple one. Placement of a sensitive wide spectrum photoelectric cell (capable of detecting radiation to the limits of vacuum UV), wired in the traditional closed circuit manner from a battery supply, at any distance short of sparking from the distal terminal of the coil will show in the dark that the light output from the coil is negligible. This rules out optical radiation at high frequency. The demonstration that the sensible heat output from the Tesla coil is also negligible will be addressed below.

Our theory proposed the existence of physical processes whereby massfree electric radiation can be converted into electromagnetic radiation. Such a process is at work whenever massfree electric wave radiation interacts with electrons, such as those that remain in the valence bands of atoms. This massfree electric energy interacts with charge carriers, such as electrons, to confer on them an electrokinetic energy which they shed in the form of light whenever that electrokinetic energy is dissociated from those carriers (e.g. by deceleration, collision or friction processes). Such a process is at work to a negligible extent in the coil itself and its usual terminal capacitance, hence the faint glow that can be seen to issue from it, but it can also be greatly amplified in the form of a corona discharge by connecting a large area plate to the output of the secondary, as Tesla himself did in his own experiments, and thus by increasing the capacitance of the coil system. Now, what is interesting in this process is that, in the absence of virtually any $I^2R$ losses at the plate, and if the plate thus introduced is bent at the edges so that it has no pointed edges, or if it is in the form of a bowl, or in any other manner that precludes sparking at edges and specially corners, and thus enhances the corona discharge, any electroscope, whether negatively or positively charged, now brought close to the plate will show a tendency to arrest its spontaneous discharge rate. One might say that this is simply the result obtained in a Faraday cage that disperses charge on its outside and insulates electrically its interior, and indeed if an electroscope is placed inside a Faraday cage no amount of Tesla radiation on the outside of that cage, save direct sparking, adversely affects the leakage or seepage rate of the electroscope. In fact, since the effect of such a cage can be shown to be that of, by itself, inducing arrest of either spontaneous electroscopic discharge, this effect simply remains or is magnified when the cage is bathed by Tesla radiation. However, a cage constitutes an electrically isolated environment, whereas a plate with or without curved or bent edges does not. Furthermore, the change observed in the properties of the output radiation from a Tesla coil when certain metal plates or surfaces are directly connected to the distal terminal of the secondary, takes place whilst the capacitance of the coil is increased by the connected plate, and thus the plate is an electrically active element of the circuit—and hence the opposite of an electrically isolated element.

Figure 2:
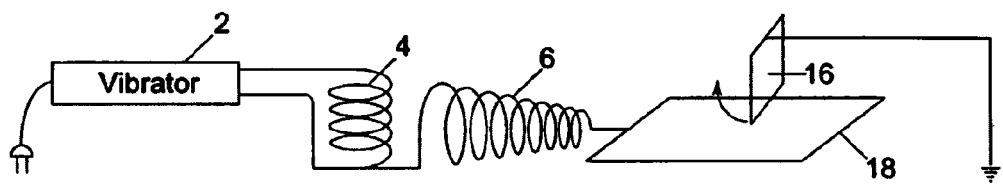
FIG. 2 is a schematic view of a Tesla coil connected to a gold leaf electrometer.

For a long time we believed that the anomalous cathode reaction forces observed in autoelectronic discharges (atmospheric sparks, autogenous PAGD (pulsed abnormal glow discharge) and vacuum arc discharges) were exclusive to an autoelectronic emission mechanism prompted by a direct potential between discharging electrodes. Sparking driven by AC potentials could sustain the same forces, but their mutual cancellation over time would not deploy a net force. In this sense, when a large gold leaf connected directly to the ground (via a water pipe or any other suitable connection) or to another large area plate suspended at some height above the ground, is vertically placed at a sparking distance above the surface of another plate connected to the secondary of a Tesla coil, one would not expect the AC spark to sustain any net force across the gap between the gold leaf and the plate. In terms of cathode reaction forces, one would expect their cancellation to be simply brought about by the high frequency of the current alternation in the coil, as both leaf and plate would alternate between being the emitting cathode or the receiving anode. However, this is not what is observed—instead, the gold leaf 16 lifts away from the plate 18 (FIG. 2). Connecting instead the suspended gold leaf to the coil terminal, and the bottom plate to the ground in the same manner as described above, also yields the same result.

Even more curious is the finding that this anomalous reaction force deployed by an alternate current of mass-bound charges in the arc, remains present when the sparking is prevented and instead the corona effect is enhanced (by employing a large plate connected to the distal pole of the secondary, and by employing a distance at which sparking ceases), as if the lift itself were the property of the corona underlying the spark channels and not the property per se of the autoelectronic emission mechanism.

By mounting directly the suspended leaf 16 (41 mg of hammered 99.9996% pure gold) at the end of a long dielectric rod 20 balanced at the center and placed on a light stand over an electronic balance 22, we sought to determine the observed lift of the leaf as weight lost. Surprisingly, and despite the most apparent lifting motion of the leaf, the balance registered a substantial weight gain, indicating the addition of 1 to 5 mg weight (with the same 14 W input to the vibrator stage), independently of whether the leaf was connected to the terminal of the coil or instead to the earth ground via a water pipe. This suggested to us that, whether formed as a DC or AC spark channel, or whether in the form of a corona discharge, the electric gap develops an expansion force (exactly opposite to a Casimir force) on both electrodes, independently of their polarity, which force is responsible for the observed repulsion. Yet, this expansion goes hand in hand with an increase in their weight such that some other process is at work in that electric gap.

Figure 3:
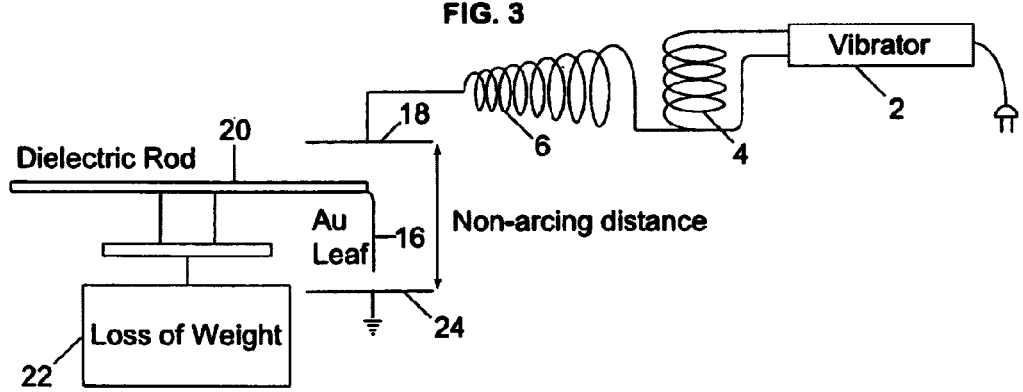
FIGS. 3–6 show alternative electrometer configurations.
Figure 4:
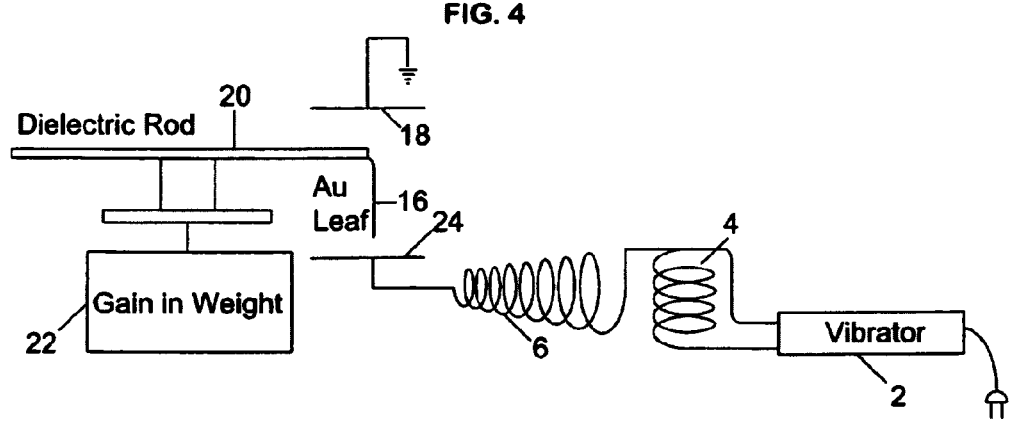

To examine this problem further, we assembled a different experiment where the gold leaf 16 was suspended between two large metal plates 18, 24 placed 20 cm apart, and the leaf was not electrically connected to them or to any other circuit, while attached to the dielectric rod employed to suspend it over the electronic balance. Given that the leaf is suitably and equally spaced from both plates, there is no arcing between it and either plate. The obvious expectation is that, since the electric field bathing the leaf alternates at high frequency (measured in hundreds of kilohertz), and the corona from both electrodes should equalize and balance any electric wind, no lift should be observed. In fact, no lift is apparent, but a most curious observation is made: depending upon which orientation is employed for the plates, the gold leaf either gains or loses 4–6% of its weight. This gain or loss is registered for as long as the coil is on. If the top plate is grounded and the bottom one connected to the different terminal of the secondary, a gain in weight is observed (FIG. 3). If the connections are reversed, an equal weight loss is registered (FIG. 4).

Figure 5:
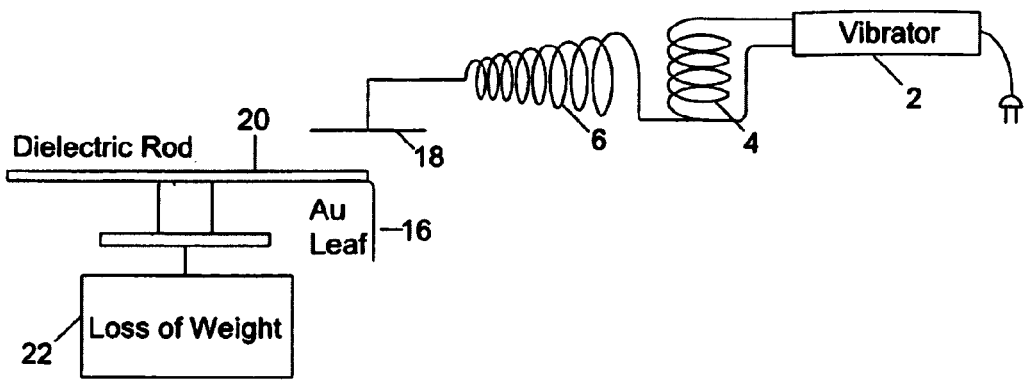

Furthermore, in this last instance, if the grounded plate 24 is entirely removed (FIG. 5), and only the top plate remains connected to the distal terminal of the secondary, the observed loss of weight continues to occur such that effectively this reaction can be obtained with unipolar electric fields of high frequency, and provides a unidirectional force which, once exerted upon metallic objects bathed by its field, can be made to oppose or favour gravity.

Figure 6:
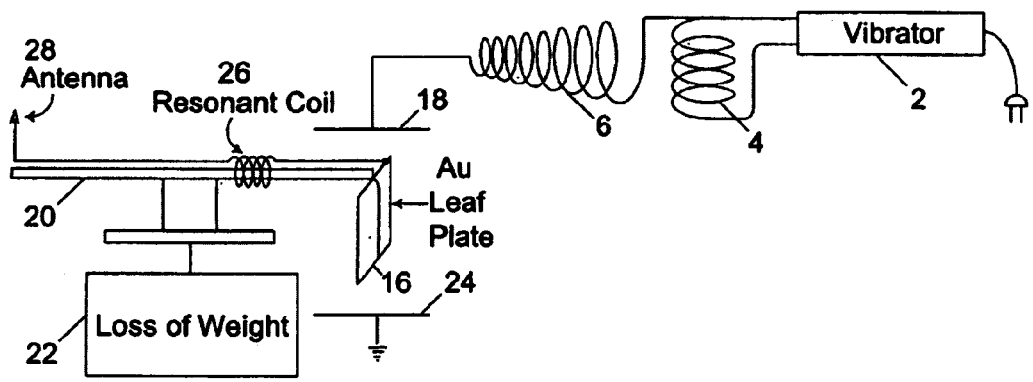

Now, these effects can be greatly magnified, in the order of 10-fold, if the same gold leaf is made part of a simple series floating electric circuit where the leaf functions as a large area plate, and is wired in series with a coil 26 which, for best results, should be wound so as to be of a length resonant with the secondary of the Tesla-type coil employed; and this coil is connected in turn to a point antenna 28 upwardly oriented (FIG. 6). The entire floating circuit is mounted on the rod 20 and this in turn is mounted over the sensitive balance. If both plates are kept as in FIGS. 3 & 4, the observed weight loss and weight gain respectively vary between 30 to 95% of the total weight of the leaf. Again the gain or loss of weight is registered for as long as the coil is on.

These anomalous findings suggested that whatever is the nature of the energy responsible for the force observed in that high frequency alternating current gap, any metallic object placed in that gap will experience a force repelling it from the electric ground. This force will be maximal if the gap frequency is tuned to the elementary or molecular structure of the metallic object. If the electric ground is placed opposite the actual plane of the earth ground, that force will act in the direction of gravity. If, instead, the electric ground and the earth ground are made to coincide on the same plane, that force will act opposite the direction of gravity, i.e. will repel the metallic object from the ground.

No such weight alteration was observed with solid dielectrics, for instance with polyethylene and other thermoplastic sheets.

These facts rule out the possibility of a hidden electrostatic attraction force acting between the plate connected to the different terminal of the secondary and the gold leaf. First off, such an attraction would be able to lift entirely the gold leaf, as is easily observed with the unipole of any electrostatic generator operating with a few milliwatts output with either negative or positive polarity; secondly, the same attraction, if it existed and were the product of an electric force, would surely be manifested independently from whether the experimental leaf was metallic or a dielectric (as again is observed with electrostatic generators).

The results suggest therefore that whenever a large plate is connected to a Tesla-type coil, it induces in surrounding matter that is not part of its own circuit, a directional thrust oriented opposite the electric ground and, if the latter coincides with the gravitational ground, a thrust oriented opposite free fall.

When this thrust is made to oppose gravity, we believe that its effect upon the gold leaf can be compared to the lifting power imparted to the water molecule when it transits from the liquid to the vapor state and which is associated with the increase in internal (or intrinsic) potential 'thermal' energy $\Delta U$ (See Halliday D & ResnickR (1978) "Physics", Vol. 1, section 22–8, p. 489). The "specific latent heat" of water (m*L) contains indeed both an expression for the sensible radiant thermal work involving volume and pressure relations (W=P($V_V$-$V_L$), where P=1 Atm, and $V_V$ and $V_L$, respectively, are the molar volumes in the vapor and liquid phases), and an expression for a quantity of "latent" energy ($\Delta U$) which is associated with the molecule in the more rarefied state. Hence, the relation for the latter with respect to water vapor:

$$\Delta U = (mL) - [P(V_V - V_L)]$$

We propose that likewise, if a very small portion of the energy of the massfree electric waves is indirectly transformed by massbound charge carriers on that plate into blackbody photons (once those charge carriers shed their electrokinetic energy), the greater portion of those waves are directly transformed in the space adjacent to that plate into the latent energy equivalent to $\Delta U$ for the atoms of the surrounding air, and so on, until this process itself is also occurring for the atoms of that gold leaf, thus inducing their nonelectrical weight loss and suggesting the existence of a nonthermal "antigravitokinetic" energy term heretofore unknown to mankind other than as "latent heat" or "internal potential energy".

From this viewpoint, the energy released by any Tesla-type coil to its surroundings would be tantamount to a radiative injection of "internal potential energy" which would confer on local gas molecules a weight cancellation (a cancellation of gravitational mass occurring in the absence of any cancellation of inertial mass—a process which the inventors theorize is explained by the neutralisation of elementary gravitons), and the same process would be equally at work for metallic solids but not dielectric solids.

Gold vapour also deploys a substantial intrinsic potential energy. With an enthalpy of vaporization on the order of $H_v$=324 kJ mol$^{-1}$, the molar volumetric work performed by gold vapor at atmospheric pressure at the temperature of vaporization $T_v$ (2,856° C., i.e. 3129 degrees Kelvin) is:

$$W = P\Delta V_{V-L} = 23.58 \text{ kJ mol}^{-1}$$

where $\Delta V_{V-L}$=0.2327 m$^{-3}$. The intrinsic potential energy of gold vapor is then given by:

$$\Delta U = H_v - W = 300.4 \text{ kJ mol}^{-1}$$

i.e. 12.74 times greater than the volumetric work performed during the phase transition.

It is our contention that this intrinsic potential energy, associated with molecules as their "latent heat", has fine structure that in turn is altered if this energy is released from these molecules and fails to gain a "sensible" thermal form.

What is suggested is that the fine structure of "latent heat" is not electromagnetic and obeys instead the molecular function:

$$\Delta U/N_A = \lambda_{n2}^2 c f_{n2}$$

where $N_A$ is Avogadro's number, the wavelength denoted as $\lambda_{n2}$ is the wavelength-equivalent of the mass of the molecule to which the "latent heat" is associated, obtained by a conversion method proposed in these inventors' theory, and the frequency term f is a nonelectromagnetic frequency term, specifically in this case a gravitational frequency function. Employing the conversion of Joules into m$^3$ sec$^{-2}$ proposed by these inventors as being exactly 1 J=10$N_A$m$^3$ sec$^{-2}$, and putting the wavelength $\lambda_{n2}$ down as the wavelength-equivalent of the mass of the gold atom, $\lambda_{Au}$, at 1.9698 m, that frequency term $f_{n2}$ can be obtained as being equal to 2.6*10$^{-3}$ sec$^{-1}$. According to the present inventors' theory, the wavefunction c constitutive of the fine structure of "latent heat" associated with molecules of matter, carries the same wavelength $\lambda_{Au}$ and its frequency is given in the usual manner by $c/\lambda_{Au}$=1.52*10$^8$ sec$^{-1}$. The resultant frequency for the non-Planckian unit quantum of "latent energy" associated with each gold atom at the vaporization temperature is then obtained by the geometric mean of the two synchronous frequency terms:

$$[(c/\lambda_{Au})f_{n2}]^{0.5} = 624 \text{ Hz}$$

However, this is the signature of that intrinsic potential energy when associated with that gold atom at its vaporization temperature. It is not the signature of the energy quantum itself if it is released from that molecule, nor prior to being absorbed (i.e. in transit), at that same temperature. The fine structure of the same non-Planckian "latent" energy quantum varies to encompass different determinations of the constituent wavelength and frequency functions. The basic relation for the determination of the wavelength of a "latent thermal" energy quantum not associated with matter, but corresponding to one that is, is:

$$\lambda_{n1} = [\Delta U/N_A)/c]^{0.666} \text{ meters}^{-0.333} \text{ seconds}^{0.666}$$

which gives 0.046478 m for the unbound equivalent of the "latent heat" unit quantum of vaporization associated with the gold atom at one atmosphere. The fine structure of the free quantum is still parallel, as given by:

$$\Delta U/N_A = \lambda_{n1}^2 c f_{n1}$$

but now notice how the frequency terms have changed value, with the $f_{n1}$ function having the value 4.65 sec$^{-1}$ and $c/\lambda_{n1}$ yielding 6.48*10$^9$ sec$^{-1}$. The geometric mean of the superimposition of the two frequencies is then—

$$[(c/\lambda_{n1})f_{n1}]^{0.5} = 173.7 \text{ KHz}$$

We contend that it is at this frequency that the atoms of gold vapor absorb "latent heat".

However, this is just the overall scenario of what happens at the temperature of vaporization of gold. But at room temperature (e.g. 293 degrees Kelvin), and with respect to processes where there is no sublimation of the atoms of that gold leaf under way (and indeed, once the coil is turned off, the leaf returns to its normal weight), one must infer to a different phase of matter what portion of "latent heat" energy, if any, do the atoms of gold hold in the solid phase lattice. Assuming the same proportionality between the "sensible" and "latent" thermal energy terms for atoms of gold at room temperature, where the unit thermal energy is $N_A kT=2.436$ kJ mol$^{-1}$, the gold atom could absorb up to 12.74 times, we speculate, the value of this "sensible" thermal energy, and thus hold $N_A kT=31.053$ kJ more energy in its own micro-atmosphere.

If this speculation is correct, and employing the above novel methodology, then the mean geometric frequency of the maximal "latent heat" energy quantum of a gold atom at room temperature would be 538 KHz (versus 174 KHz at the vaporization temperature), and once absorbed its mean frequency mode would abate to 201.5 Hz (versus 630 Hz once the atom has vaporized).

To test this hypothesis we employed two different Tesla-type coils having output frequencies of 200 KHz and 394 KHz. The circuit tested was that shown in FIG. 6, and both coils were operated at 50 KV outputs. Whereas the former coil, closer to the 174 KHz marker, could only systematically produce 10–11 mg of weight cancellation in the gold leaf of the floating circuit, the second coil, closer to the speculated 538 KHz marker, could produce 15–35 mg of weight cancellation in the same gold leaf. The empirical results appear therefore to suggest that our speculation may well be a valid one.

The above-mentioned full wave divider (see FIG. 1) can be easily coupled to our autogenous pulsed abnormal glow discharge technology as described in our U.S. Pat. No. 5,416,391 to form an alternative source of direct current, ultimately powered by Tesla waves, and such a drive can equally be applied to any other vacuum device that can sustain endogenous oscillatory discharges, whether in the PAGD regime or any other pulsatory regime. For the purposes of experimental and visual determination of power outputs from the divider in question, we have utilized either 2 Torr vacuum tubes operating in the high-current PAGD regime, or 20–100 Torr spark tubes requiring high voltages (2 to 10 KV) for their spark breakdown. As taught in the above U.S. Patent, the output from the full wave voltage divider can be assessed by the energy spent in driving the tube and the motor, whose rotary speed is proportional, within the limits chosen, to the power input.

Figure 7:
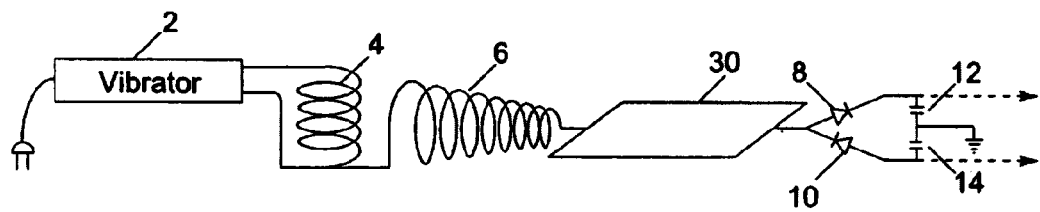
FIGS. 7–11 show modifications of the circuit of FIG. 1.
Figure 8:
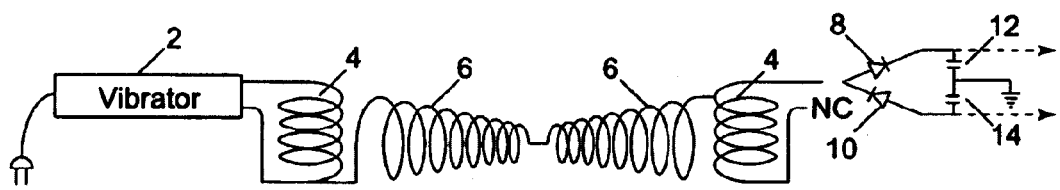
Figure 9:
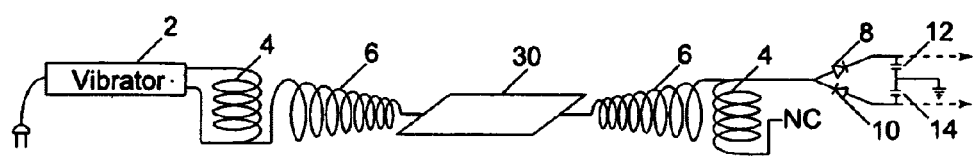

Two separate sets of experiments set forth in Table I below showed that direct connection of the wave divider to the distal terminal of the coil (set constantly at 6 clicks on the vibrator stage) (FIG. 1) or to the same terminal but across a large (2 or 3 square feet) plate 30 that increased the capacitance of the secondary (FIG. 7), presented the same power output in either case (the effect of the plate is to lower the voltage of the output proportional to the increase in current). A substantial increase in power output through the divider is observed only when an identically wound Tesla coil is connected in reverse (FIG. 8) with the non-common end of its winding 4 not connected, in order to obtain a condition of resonance, and this observed increase is further augmented by now interposing either of the metal plates 18, 24 between the two chirally connected and identical coils (FIG. 9). The increase in plate area appears to have the effect of increasing the output for as long as the plate is isolated between the two chiral image coils. Throughout these experiments the input power to the vibrator was fixed at 14 W (60 Hz AC).

TABLE 1

| Status | Pulse rate (PPS) | Motor rotation (RPM), M ± SEM |
|---|---|---|
| Expt A | | |
| Tesla coil (TC) to divider | 2.6 | 582.5 ± 3.9 (n = 4) |
| TC to inverted TC, to divider | 4.4 | 621 7.6 (n = 4) |
| TC to 2 ft$^2$ plate, to inverted TC, to divider | 5 | 775.25 ± 23.6 (n = 4) |
| Expt B | | |
| Tesla coil (TC) to divider | 2.2 | 613 ± 5.6 (n = 12) |
| TC to 3 ft$^2$ plate, to divider | 2.3 | 605 ± 2.6 (n = 12) |
| TC to inverted TC, to divider | 2.3 | 722 ± 5.7 (n = 12) |
| TC to 3 ft$^2$ plate, to inverted TC, to divider | 4.2 | 877.6 ± 6.5 (n = 12) |

In our loss of weight experiments described above, we noted that the phenomenon of weight loss by a metallic body placed in proximity of the coil output continued to be observed when only the plate connected to the distal pole of the secondary was retained. The leaf, although not part of the circuit of the secondary, could however be seen as part of a circuit for the capture of ambient radiant energy, specifically that generated by the coil and, as well, that also possibly picked up, in the process, from other ambient sources. To determine whether the last consideration is a possibility at all, or whether the energy picked up by an analogue of our metallic body or gold leaf in the experiments described above, is entirely a byproduct of the energy transmitted by the plate connected to the distal pole of the secondary, we next determined what would happen if the pick-up for the full wave-divider were placed not at the output from the secondary coil, but from an in all respects identical plate (the Receiver plate R, as opposed to the Transmitter plate T) placed a distance away from, and above, the first one. In other words, the gold leaf is replaced by a receiver plate, and this carries an attached test circuit identical to the test circuit employed to assess directly the coil output.

Figure 10:
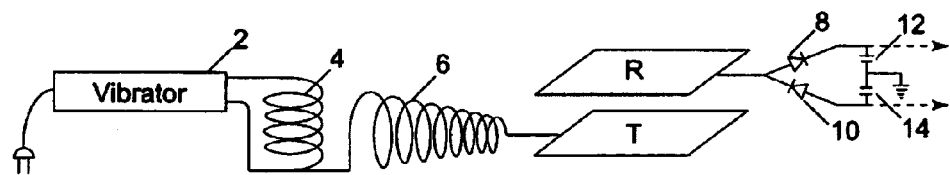

As shown in Table 2 below, the results of the experiment show that there is no loss of energy picked up at the R plate (FIG. 10) when compared to the most favourable situation involving the plate 30 (FIG. 9) interposed between the chirally connected coils. This observation is however not always the case. For best results one should employ iron, gold or silver plates placed parallel to the horizon, with the T plate underneath the R plate. In fact, if one employs instead aluminum plates and suspends these vertically, one can consistently register a loss of output at the divider when changing the divider input from the T to the R plates.

Figure 11:
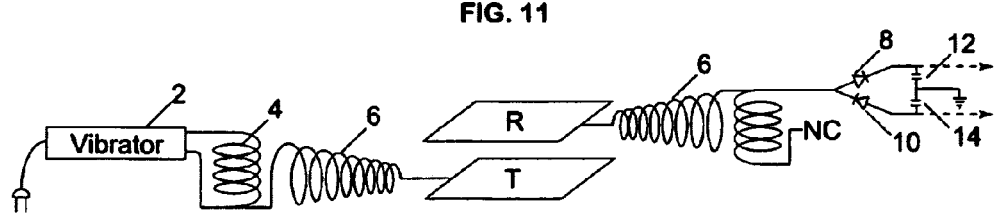

If however the plate R is connected in turn to a second identical coil, also wired in reverse, and this second coil in turn serves as input to the full wave divider (FIG. 11), then a most curious occurrence takes place—the power output increases considerably (see Table 2), as if the divider circuit had undergone an energy injection not present at the source. Note that the circuits are in fact resonant, but the energy injection contributing nearly 60–66% (for both plate areas in the previous experiment) of the input that we refer to, is not caused by inductive resonance, since the effect of resonance can be ascribed to the set-up described in FIG. 9. The distance between the plates, as well as their orientation with respect to the local horizon system of the observer also appear to matter, best results being achieved at optimal distances (e.g. for 2 square feet plates the best gap, at 43% RH and room temperature, was at least 6 inches).

TABLE 2

| Status | T R distance | Pulse rate (PPS) | Motor rotation (RPM), M ± SEM |
|---|---|---|---|
| 2 ft² plates | | | |
| R plate to inverted TC, to divider | 3" | 6.7 | 882 ± 17.5 (n = 4) |
| | 4" | 8 | 906 ± 12.1 (n = 4) |
| | 6" | 10 | 936 ± 46.1 (n = 9) |
| 3 ft² plates | | | |
| TC to T plate, to divider | 0 | 2.3 | 605 ± 2.6 (n = 12) |
| R plate to divider | 6" | 3.3 | 890.1 ± 3.8 (n = 12) |
| R plate to inverted TC, to divider | 6" | 5.1 | 1009.2 ± 4 (n = 12) |
| R plate to divider | 8" | 4.0 | 783.1 ± 11.3 (n = 12) |
| R plate to inverted TC, to divider | 8" | 5.1 | 1005.7 ± 6 (n = 12) |

Figure 12:
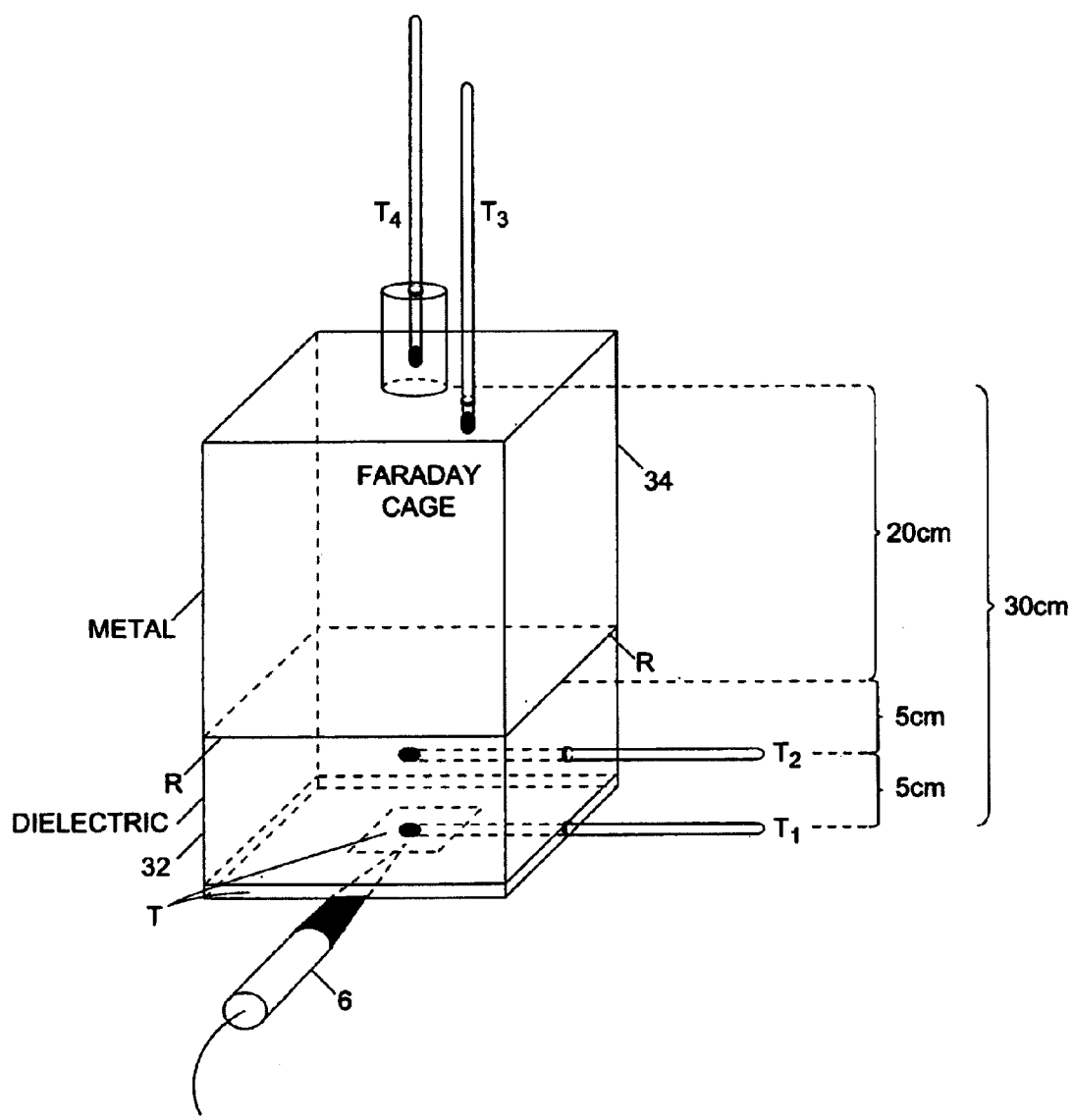
FIG. 12 shows apparatus for investigating aspects of the experimental results obtained with the foregoing devices.
Figure 13:
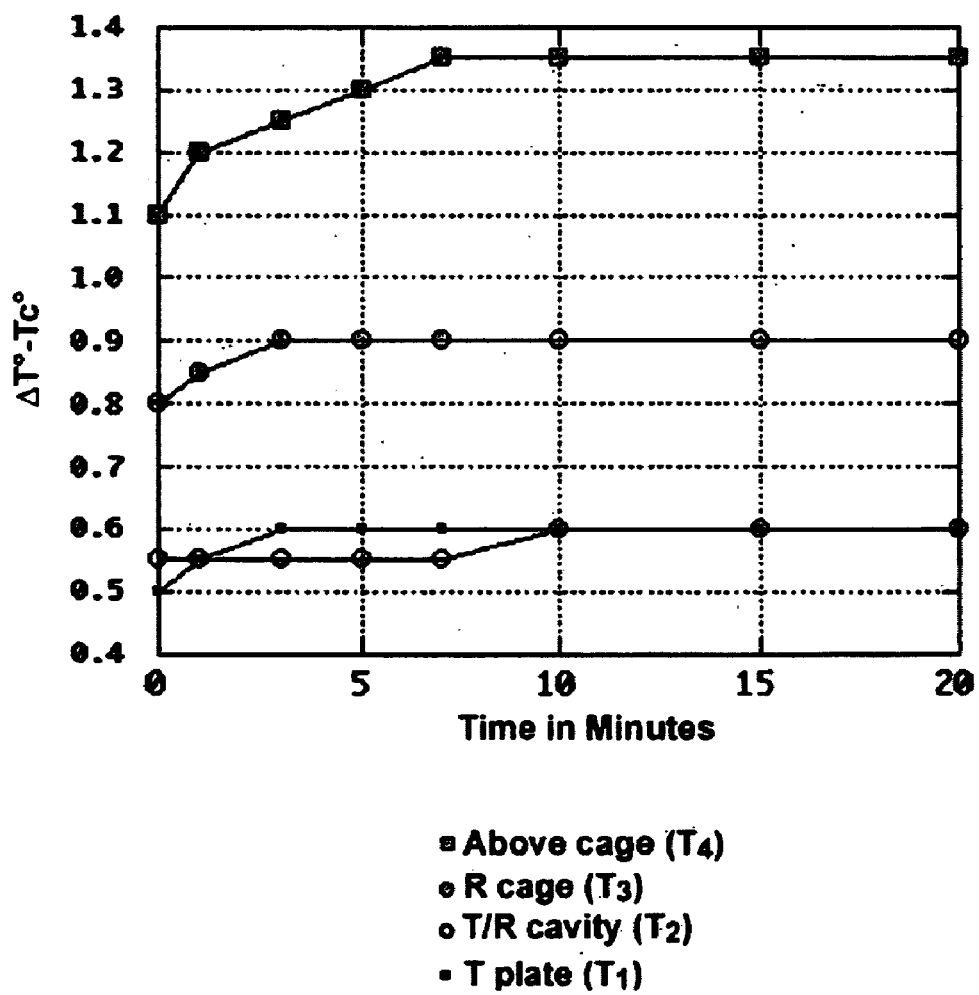
FIG. 13 is a graph illustrating results obtained from the apparatus of FIG. 12.

We tested the possibility that environmental heat produced by operation of the coil might be the source of the injected energy, the plate of the second system acting possibly as collector for the heat present in the gap. As it turned out, experiments showed repeatedly that in the gap between the T and R plates there was no significant thermal radiation propagating between one and the other. The more illustrative experiments are those in which we identified where the sensible thermal energy appears, and which involved coupling two cavities: the Transmitter-Receiver gap between plates T and R, and a Faraday cage enclosure 34 (see FIG. 12). The first cavity appears to be much like that of a capacitor: the two identical parallel plates are surrounded by a thick dielectric insulator 32, and a thermometer T2 is inserted half-way through it. A thermometer T1 is also affixed to the T plate, to read its temperature. The second cavity is a simple metal cage, also insulated, with a thermometer T3 inserted 2 cm into its top. 2–4 cm above the top of the cage there is placed a fourth thermometer T4, within an insulated cylinder. If the TC is a source of thermal energy (e.g. IR radiation, microwaves, etc.) we would expect the T plate to be the hottest element from which, by radiation, thermal energy would reach the middle of the first cavity making the next thermometer T2 second hottest, and that the third thermometer T3 inside the second cavity, even if it might initially be slightly warmer than the other two, would, over time, become comparatively cooler than either one of the other two thermometers, despite the fact that the rising heat would still be seen to warm it up over time. One would expect a similar outcome for the fourth thermometer T4, above the cage. As shown by FIG. 13, where only the temperature differences ($\Delta T°–T_c°$) between the experimental thermometers and the control thermometer reading the air temperature $T_c°$ of the laboratory are shown, the surface of the T plate warms up by 0.1° C. at 3' after initiation of the run (closed squares), whereas in the space of the T/R gap a diminutive warming, by 0.05° C., is registered after 10' (open circles). Conversely, the temperature inside the cage, at the top (shaded circles) rises by 0.1° C. also by the third minute, and the temperature above the cage itself (shaded squares) rises by a much greater difference of 0.35° C., which remains stable after the eighth minute.

These results show that it is not sensible heat that radiates from the T plate. Rather, some other form of radiation traverses these cavities to generate sensible heat at their metallic boundaries, such that more heat is generated above the R plate (inside the cage) and again above the third plate, i.e. above the top of the cage, than is generated in the T/R gap, i.e. proximally to the T plate. This clearly shows that the Tesla coil is not a significant source of thermal radiation, and that sensible heat can be detected inside and atop the Faraday cage only as a further transformation of the radiant energy transmitted across the T/R cavity.

The same experiment also illustrates that, whatever is the nature of the additional environmental energy being injected at the surface of R plate (as shown by Table 2 results above), it is most likely not thermal radiation, at least not energy in the form of sensible heat. And whatever is the nature of this ambient radiant energy being mobilized by the electric radiant energy transmitted from the T plate, it can produce significant heat inside an enclosure contiguous with plate R.

Since we also know experimentally that this observation of an ambient energy injection at the R plate or R cage depends upon relative humidity, being most easily observable when the latter is low (<50% RH), and being virtually impossible to observe when air is saturated with water vapor, we can infer that water vapor is a good absorber of the electric massfree radiant energy emitted from the T plate. This strongly suggests that this absorption process is tantamount to increasing the potential intrinsic energy $\Delta U$ of the water vapor molecules adjacent to the T plate. In the absence of significant quantities of water vapor, when the atmosphere is dry, one may speculate that this absorption process is replaced by what one presumes is a parallel process involving the various gaseous molecules of air. However, either because the air molecules involve molecular species that readily give off this potential energy, as one might speculate is the case with molecular oxygen, hydrogen and nitrogen, or because the air molecules absorb far less "latent" energy (as appears to be the case with inert gases), and therefore there is more of it in the molecularly unbound state (as we explicitly propose as a possibility) and thus available for absorption by the appropriately tuned receiver, the increased $\Delta U$ of air molecules conferred by the absorption of the massfree electric radiation in the T/R gap is transferred to the R conductor together with the latent energy which those molecules already possessed before entering that gap. Hence the energy injection and its dependency upon the partial pressure of water vapor, which absconds instead with this "latent" energy and succeeds in withholding it from transmission to the R plate.

If the T/R gap can mobilize ambient energy which is neither electromagnetic nor thermal in nature, but which "latent" energy becomes injected into the divider circuit in electric form, the heat (i.e. sensible thermal energy) produced inside and atop the cage can also be mobilized electrically as input into the divider circuit. The obvious place to look for the emplacement of the cool junction that could convert sensible heat into electrokinetic energy of massbound charges is at the top of the cage, where it is warmest (See top curve of FIG. 13 in shaded squares). This is clearly observed from the results shown in Table 3 below, where the initial temperature difference between the top of the box and the T plate surface was 0.5° C., and the top of the box temperature rose by 0.2° C. after 2.5 minutes when the divider was connected at the junction, versus 0.35° C. when it was not (and the transmitter coil was on).

TABLE 3

| Status 3 ft² plates | TR distance inches | Pulse rate PPS | Motor rotation RPM, M ± SEM(n = 12) |
|---|---|---|---|
| TC to T plate, to divider | NA | 4.2 | 877.6 ± 6.5 |
| R plate to inverted TC, to divider | 6" | 5.1 | 1009.2 ± 4 |
| Top of naked R plate/cage to divider | 6" | 5.4 | 1047.1 ± 5.7 |
| Top of insulated R plate/cage exposed to sun, to divider | 6" | 6.1 | 1072.4 ± 8.7 |

For the run performed with the naked R cage, the temperature directly above the top of the cage was 24.3° C., at the outset, versus the control room temperature of 23.9° C. For the run performed with the insulated R cage exposed directly to the sun at midday, on a cool and clear August day, the temperature directly above the top of the cage was 33° C., versus the control air temperature of 18.4° C. The temperature of the cool junction at the top of the cage was 31.9° C. while the run was performed.

It is apparent from the data of Table 3 how a second injection of energy has occurred in the apparatus. If, within the T/R gap, the energy injected appears to be on the order of absorption of "latent heat", at the top of the cage cavity, at the cool junction, the injection is one of radiant "sensible" heat. Moreover, this secondary energy addition could be further enhanced by placing strong insulation around the whole apparatus or the cage itself, and further so, by exposing the whole apparatus to solar radiation.

Figure 14:
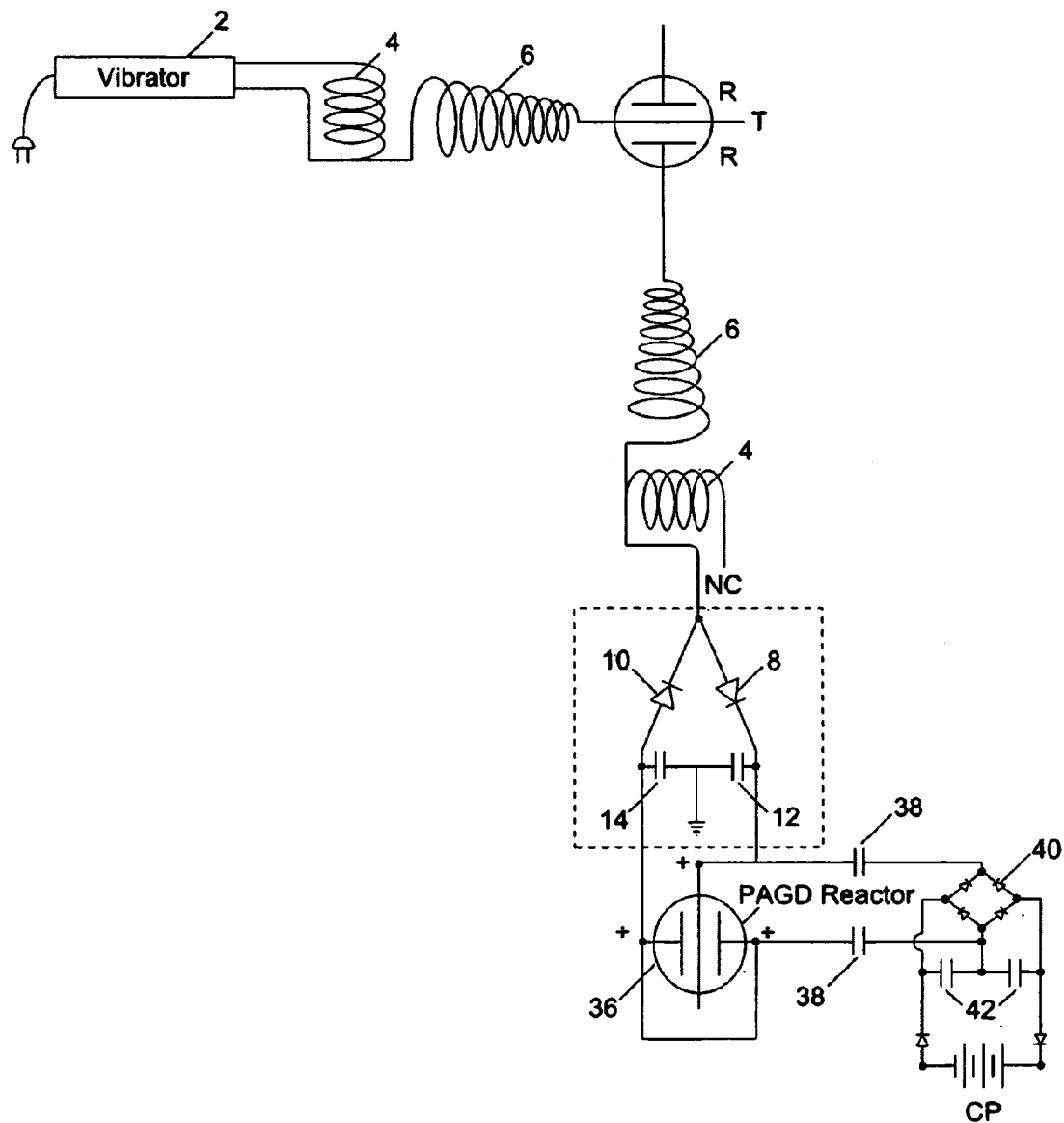
FIGS. 14–17 show schematic diagrams of embodiments of energy conversion devices.

We next turned our attention to the T/R gap cavity with the intention of determining whether atmospheric conditions or vacua yield the same or different results. We could not, of course, test the same large area plates as have been employed for the studies undertaken at atmospheric pressures. For the present purpose we employed instead large area electrodes (ca 0.2 ft²) made of high grade stainless steel or even aluminum. Preliminary results showed that these T/R gap tubes, when coupled to the divider circuit, yielded faster pulse rates in the secondary circuit when evacuated than at atmospheric pressure. The strength of the corona discharge also intensified, as it eventually became replaced by a normal glow discharge. For purposes of improved spatial capture of (1) the electric massfree energy radiated from the T electrode and (2) the non-radiant latent thermal energy mobilized by it to be collected electrically at the R plate, an axial cylindrical T electrode was inserted inside a larger concentric cylinder or between two common plates of large surface area (e.g. >100 cm²) functioning as the R electrode(s), in a dielectric container suitable for evacuation (glass, polycarbonate), at a typical distance of at least 3 cm between electrodes, and the entire device was tested at different pressures. The secondary circuit connected downstream from the full wave divider was as shown in FIG. 14 (employing an autogenous pulsed abnormal glow discharge, or PAGD, converter circuit), with the PAGD reactor 36 set at 10 Torr (in light of the high-voltage input, which varied between 1500 and 3200V) and gave the results presented in Table 4 below. We should remark also that these pulses charged the charge pack CP through the coupling capacitors 38, bridge rectifier 40 and reservoir capacitors 42, and blocking diodes 44, as expected from the prior art represented by our patents related to PAGD devices.

TABLE 4

| T/R tube Pressure (Torr) | Pulse rate (PPS) |
|---|---|
| 760 | 0.376 |
| 0.025 | 0.513 |

The effect of the vacuum in the T/R gap tube seems to be dual. By transforming the corona discharge into a normal glow discharge, it increases the local production of photons (probably associated to the formation and discharge of metastable states in the plasma), and at the same time, increases the pulse rate in the output circuit and thus, in all probability, the energy injected in the T/R gap cavity. But this did not yet permit us to confirm whether or not it is "latent heat" energy of the plasma molecules which is being tapped at the receiver plate, even if it be plausible in principle that plasmas may effect more efficient transfer of "latent heat" to tuned receivers than atmospheric gases.

The vacuum dependency of the pulse rate of the PAGD reactor employed as example in the secondary circuit downstream from the divider is also rather well marked, with the fastest pulse rates being registered at 1 Torr for the sample run shown in Table 5 below.

TABLE 5

| T/R tube Pressure (Torr) | Pulse rate (PPS) | PAGD Reactor Pressure (Torr) | Voltage (across divider) |
|---|---|---|---|
| 0.025 | 0.115 | 90 | 4.5 kV |
| 0.025 | 0.1553 | 75 | 3.5 kV |
| 0.025 | 0.183 | 60 | 3.3 kV |
| 0.025 | 0.291 | 30 | |
| 0.025 | 0.513 | 15 | 1.6 kV |
| 0.025 | 0.602 | 10 | 1.4 kV |
| 0.025 | 2.9 | 2 | 0.53 kV |
| 0.025 | 4.1 | 1 | 0.45 kV |

It is worth noting here that the illustrated polarity of the wiring of the PAGD reactor tube, as shown in FIG. 14, is best for purposes of sustaining regular autoelectronic emission at high voltage. The reverse configuration, with the center electrode negative and the plates positive favours instead heating of the cathode and a lapse into a normal glow discharge.

Figure 15:
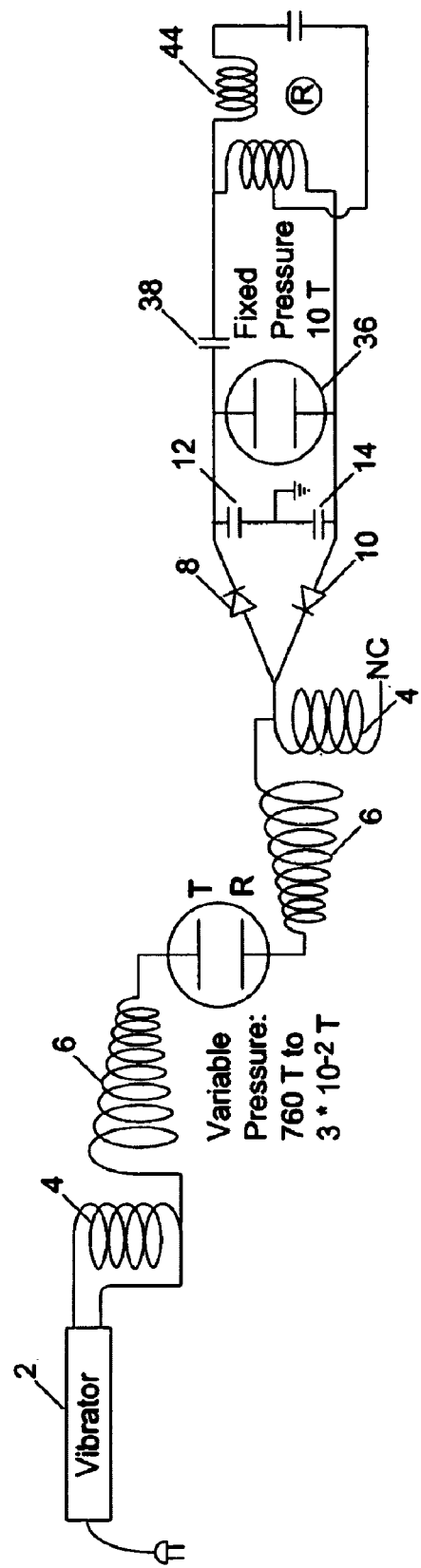

We tested a similar arrangement to that shown in FIG. 14 above, but with a PAGD motor circuit (see our U.S. Pat. No. 5,416,391). A split phase motor 44 replaces the rectifier and charge pack, and the PAGD reactor is operated at the same pressure of 15 Torr, as shown in FIG. 15. The T/R gap tube tested had a longer plate distance (2"), with one plate now functioning as Transmitter and the other as Receiver. Note also the different wiring of the PAGD reactor. The results, as shown below in Table 6, present pulse per second (PPS) and motor revolutions per minute (RPM) curve trends that appear to be analogous and parallel to the well-known Paschen curves for breakdown voltage in vacuum—such that the T/R gap performs better either in the atmospheric corona discharge mode, or in the high vacuum normal glow discharge (NGD) mode, than in the low breakdown voltage range of the curve where the discharge forms a narrow channel and takes on the appearance of an "aurora" transitional region discharge (TRD).

TABLE 6

| T/R tube Pressure (Torr) | Pulse rate (PPS) | Motor rotation (RPM), M ± SEM (n = 17) | Discharge Type |
|---|---|---|---|
| 760 | 2.8 | 751.2 ± 7.1 | Corona |
| 100 | 2.1 | 611.5 ± 5.1 | TRD |
| 20 | 2.4 | 701.9 ± 4.6 | TRD |
| 0.006 | 2.8 | 748.4 ± 9.3 | NGD |
| 0.003 | 3.0 | 819.4 ± 6.3 | NGD |

These results suggest that plasmas with high lateral dispersion, i.e. formed over large electrode areas (e.g. corona and NGD plasmas) and thus devoid of pinch, are more likely to mobilize electrically the intrinsic potential energy of the molecular charges than pinch plasmas appear to be able to do (e.g. TRD plasmas). Apparently also, the greater the vacuum drawn from the T/R gap cavity, the more efficient does the transfer of this intrinsic potential energy, ie the massbound latent heat, to the electrokinetic energy of the charges circulating in the receiver circuit become. At about $6*10^{-2}$ Torr, this transfer in vacuo is comparable to that observed under atmospheric conditions and thus for a much greater density of molecules.

Figure 18:
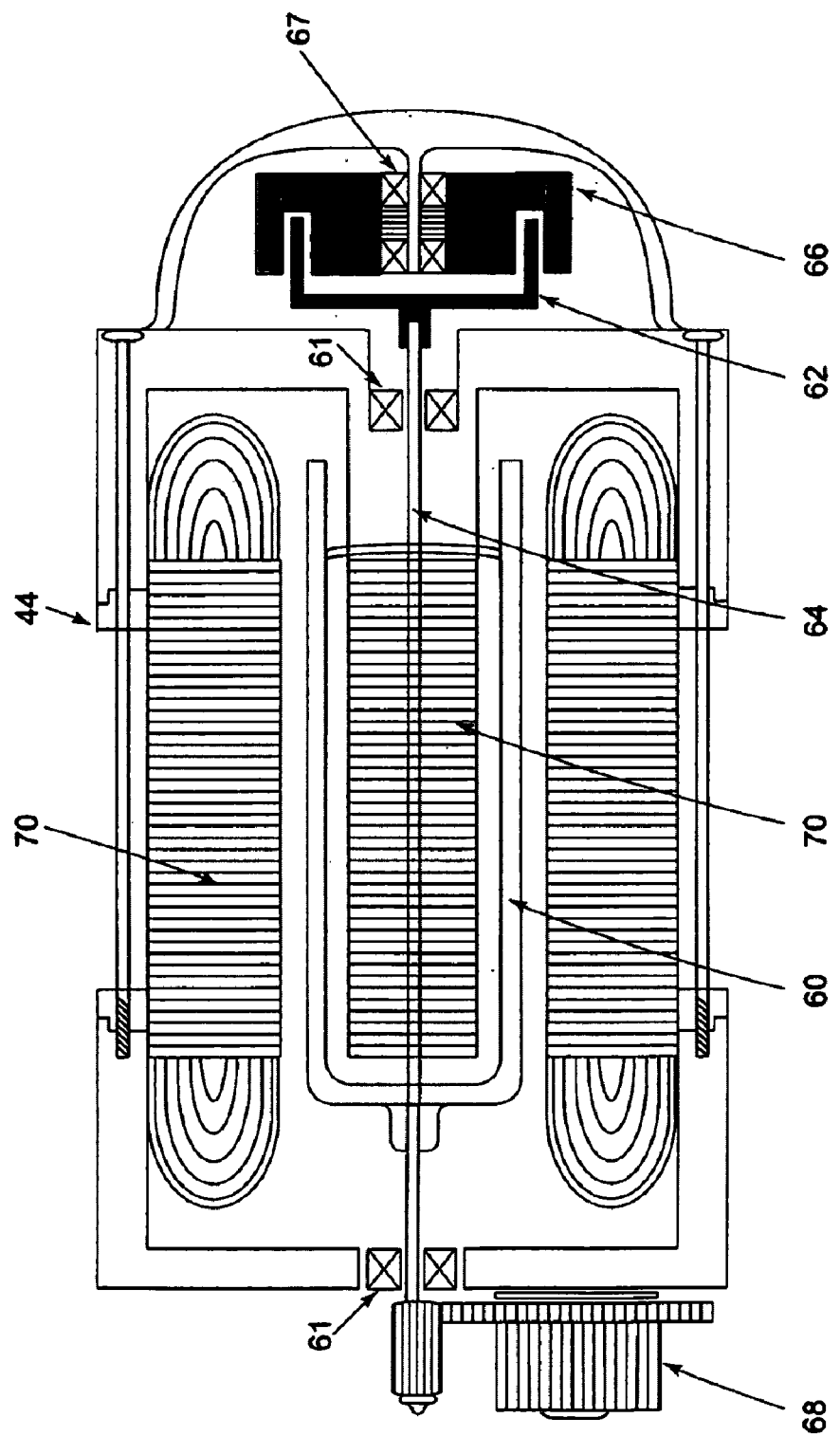
FIG. 18 is a diagrammatic cross section of an inertially damped drag cup motor.

We investigated whether it Is possible to tap the latent heat energy of water molecules. It is possible that in the vapour phase they can effectively hold onto their latent energy—but once closely packed in liquid phase could they give off some of it? To test this hypothesis we immersed the T/R gap in a glass water tank. The motor employed for these tests was a high-speed 2 phase drag-cup motor (see FIG. 18 and associated description), wired in split-phase with two identical phase windings capacitatively balanced, and the galvanized iron plates had one foot square areas. The results are shown in Table 7 below, and clearly indicate that it is possible to tap—within the T/R cavity—the 'latent heat' of water in the liquid phase. As observed, immersion of the T/R cavity in water increased the motor output speed 22% (=12,117/9888)*100). This corresponds to a 50% increase in power output, from 18 W at 9888 rpm to 27 W at 12,117 rpm:

TABLE 7

| | Pulse rate PPS | Motor rotation RPM M ± SEM | T/R distance cm |
|---|---|---|---|
| Direct from TC | 0.3 | 8076 ± 89.3 | NA |
| TC to T plate | 0.5 | 9888 ± 78.7 | NA |
| R plate | 2.75 | 12117 ± 29.8 | 30 |
| R plate | 2.9 | 12203 ± 55.9 | 60 |

Thus the use of ion-containing water or other ion-containing aqueous liquid in the cavity promotes long distance propagation and a greater injection of latent and thermal energies in the receiver circuit. Such a result is not achieved if the cavity is filled with deionised water.

Figure 16:
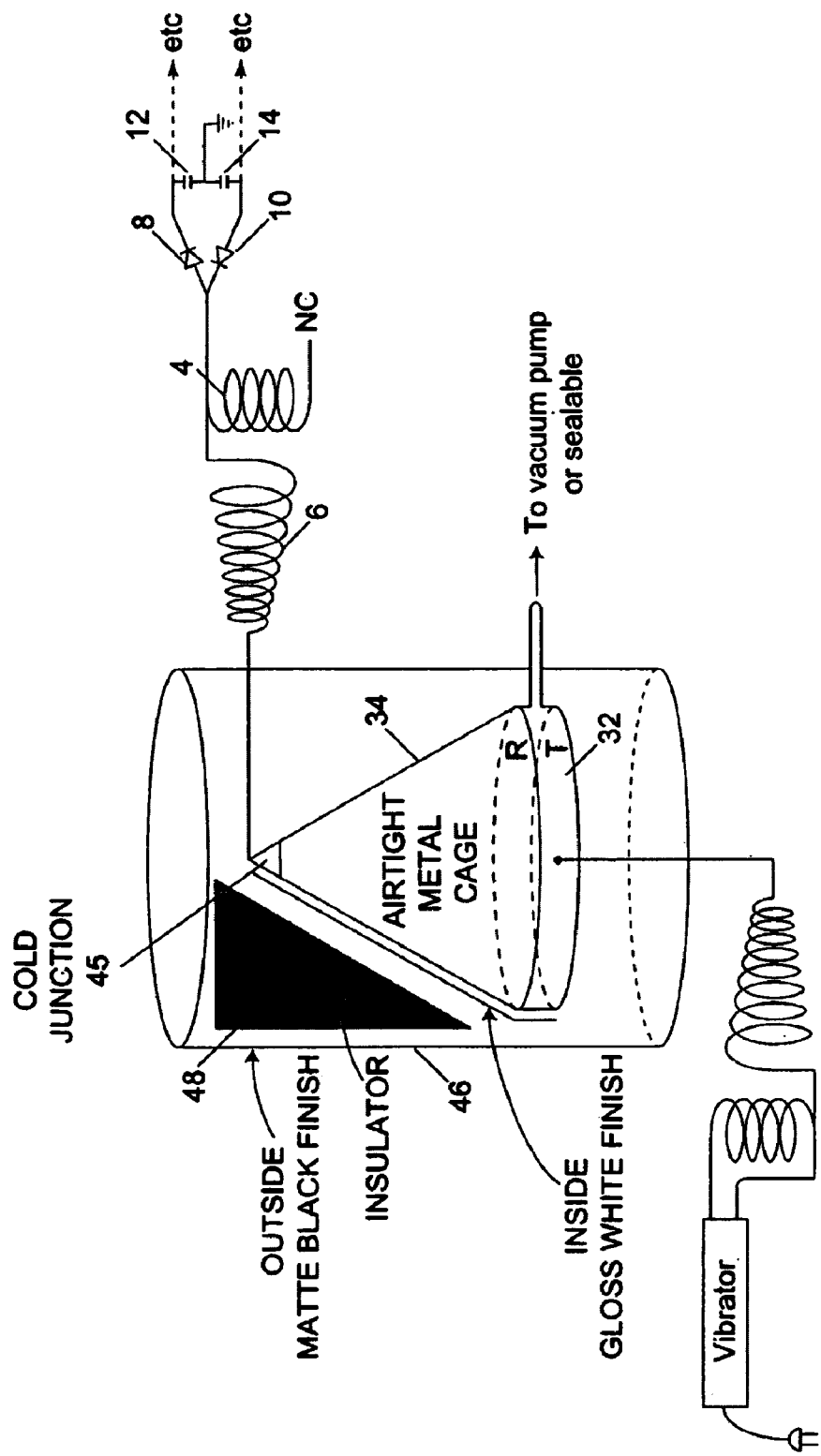

The preceding results lead therefore to the design of a presently preferred apparatus, based on these findings, for the conversion of massfree electric energy, "latent heat" energy and "sensible" heat energy into conventional electric energy, as shown in FIG. 16, which integrates all the separate findings and improvements. The winding 6 of the Tesla coil at the bottom is driven in the usual manner employing a vibrator stage 2 to pulse the primary coil 4. The distal pole of the secondary 6 is then connected to a circular metal plate T which is one end of an evacuated cylindrical cavity, connected to a vacuum pump or sealed at a desired pressure, or which forms a still containing water or other aqueous solution or liquid. This cavity constitutes the transmitter/receiver gap, and is therefore bounded by a dielectric envelope and wall structure 32, with the circular receiver plate R as its top surface. In turn this plate R serves as the base of a conical Faraday cage 34, preferably air-tight and at atmospheric pressure, but which could also be subject to evacuation, which conical structure carries at its apex provisions for a cold junction 45 and any possible enhancement of the same junction by surface application of different metallic conductors that may optimize the Peltier-Seebeck effect. The output from the cold junction where sensible thermal energy is added to the electrokinetic energy of charge carriers, is also the input to the distal end of the winding 6 of the chiral coil arrangement that sustains resonant capture of all three energy flows ((1) massfree electric waves of a longitudinal nature, (2) true "latent heat" or the intrinsic (thermal) potential energy, and (3) the thermokinetic energy of molecules, (i.e. "sensible" heat) and, placed in series with the input of the full wave divider 8, 10, feeds the circuit output from the series capacitors 12, 14 grounded at their common tap. In the T/R gap, the transmitted electric longitudinal wave energy is captured along with any intrinsic potential energy shed by molecules caught in the field. Within the R element, expanded into an enclosure that guides "sensible" radiant heat, the latter is generated and then recaptured at the cold junction.

The apparatus consisting of the cylindrical T/R gap cavity and the contiguous conical cage is then preferably finished in gloss white and cylindrically enveloped within a matte black container 46 by effective thermal insulation 48, the latter terminating at the height of the bottom disc T. Apparatus (not shown) may be provided to move the plate T vertically to adjust the T/R gap.

Figure 17:
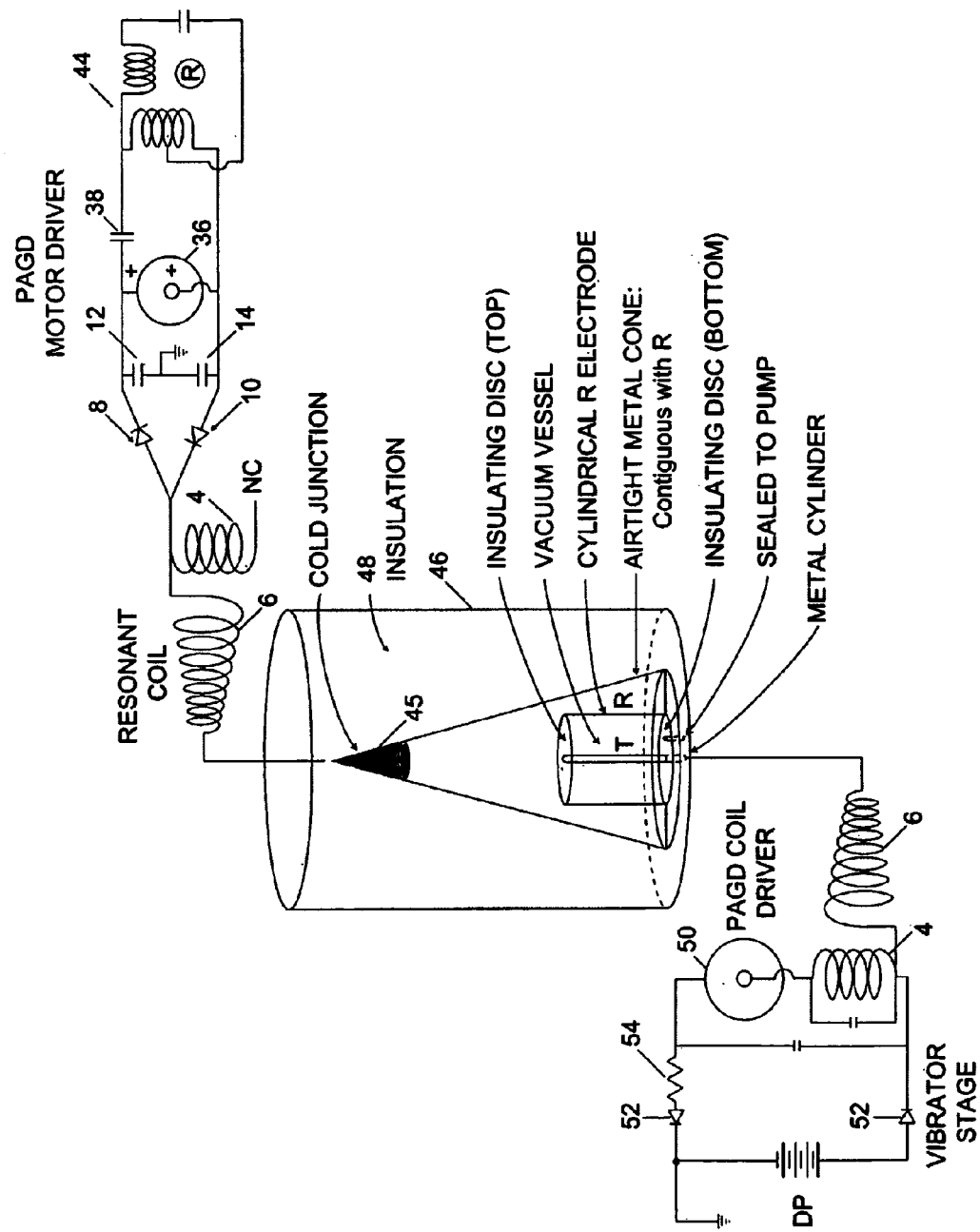

Another alternative embodiment of the apparatus is shown in FIG. 17. Here the circuit driving the apparatus is as we have set forth in our prior patents, which employs an autogenous pulsed abnormal glow discharge tube 50 in the configuration shown, supplied by a battery pack DP through blocking diodes 52 and an RC circuit formed by resistor 54 and capacitor 56 to drive the primary 2 of a first Tesla coil to obtain at the distal pole of the secondary 6 the energy to be injected to plate T in the form of a central electrode of a coaxial vacuum chamber (sealed or not), of which the cylindrical metallic envelope forms the receiver plate R, the latter being placed centrally inside the conical cage 34 and contiguous with its walls and base. The top and bottom of the coaxial chamber carries suitable insulating discs, preferably with O-ring type fittings. Again, the apparatus is enclosed in insulation within a cylindrical container 46, and the input into the capture circuit driven from the full wave divider is taken from the cold junction 45 at the apex of the air-tight cage. The output circuit is similar to that of FIG. 15.

We have found however that even when the component values in the motor driver and motor circuits are carefully selected so that these circuits are co-resonant with the damped wave (DW) component of the motor driver pulses, the motor power output falls well short of that which should theoretically be attainable. In an endeavour to meet this problem, we replaced the squirrel cage type induction motor 44 by a drag cup motor of type KS 8624 from Western Electric in the expectation that the low inertia non-magnetic rotor would allow better response to the DW component. This motor is similar to one of the types used by Reich in his experiments. Although results were much improved they still fell short of expectations. Replacement of this motor by an inertially damped motor of type KS 9303, also from Western Electric, provided much better results as discussed below.

Fundamentally, the difficulties we encountered stemmed from the inability of motor couplings to respond efficiently and smoothly, and at the same time, to the pulse and wave components of DW impulses: that is, simultaneously to the high-intensity peak current pulses (the front end event), the DC-like component, and to the damped wave trains these cause, i.e. the pulse tails (or back end event) or AC-like component. This difficulty is present even when we just seek to run induction motors from the DW impulses of a Tesla coil, the very difficulty that led Tesla to abandon his project of driving a nonferromagnetic disc rotor mounted on an iron core bar stator with damped waves.

We believe that the key to the capture of the massfree energy flux output in electric form by Tesla transmitters, including any injected latent or thermal energy that have undergone conversion into electrical energy is to employ the tuned, unipolar, Y-fed, PAGD-plasma pulser driven split-phase motor drive we have invented (U.S. Pat. No. 5,416,391) in conjunction with an inertially damped AC servomotor-generator (see FIG. 18): this has a motor shaft 64 which couples a drag-cup motor rotor 60, preferably of aluminum, silver, gold or molybdenum, directly to a drag-cup generator rotor 62 that drives a permanent magnet (PM) flywheel 66, freely rotatable in bearings 67, that provides inertial damping. The shaft 64, journalled by bearings 61 in the casing of the motor 44, provides a power output through optional gearing 68. The phase windings of the motor 44 are wound on a stator core 70 having concentric elements between which the rotor or cup 60 rotates. This structure makes it ideal for the capture of the DW impulses, whether sourced in the transmitter, amplified in the T/R cavity or sourced in the plasma pulser, all in synchrony. Effectively the motor couples the damping action of the drag-cup sleeve motor rotor, which action, as we have already found for the KS-8624 motors, is quite effective at absorbing the front-end DC-like event, with the inertial damping of the PM flywheel upon the drag-cup sleeve generator rotor, that in turn is quite efficient at absorbing the back-end AC-like wavetrain event.

The KS-9154 motor used by Reich was not an inertial damped AC drag-cup servomotor-generator. Had Reich succeeded in overcoming the limitations of his 2-phase OR Motor solution, as we have now shown it is possible to do—by applying the Function Y circuit to the PAGD split-phase motor drive which we invented, his motor would have suffered the same limitations which we encountered with the KS 8624 motor.

Any motor, by itself, has an internal or inherent damping whereby the acceleration only vanishes when the rotor is running at constant speed. For motors that operate on the basis of the drag principle, where the asynchronous slip is actually constitutive of the motor action, by inducing eddy currents in the rotor, the inherent damping is always more pronounced than for other induction motors. The damping or braking torque is produced when a constant current flows through a rotating drag disc or cup.

Aside from this inherent braking, dampers can also be applied to servomotors to further stabilize their rotation. They absorb energy, and the power output and torque of the motor is thereby reduced. Optimal operation of servomotors requires both rapid response on the part of the rotor to changes in the variable or control phase, and a stable response that is free from oscillation, cogging and overshooting. The rapid response is assured by employing low inertia rotors, such as drag-cups or cast alloy squirrel cages, and the overshooting and oscillation are reduced to a minimum by damping or a retarding torque that increases with increasing motor speed. Typically, in a viscous-damped servomotor, the damper is a drag-cup generator mounted rigidly on the shaft of the motor rotor, and the generator drag-cup rotates against the stator field of a static permanent magnet field. The generator develops a retarding torque directly proportional to speed, and the energy absorbed by the damper is proportional to speed squared. The damping can be adjusted and, as it increases, the same amount of input power yields lower torque and motor speeds. Inertial-damped servomotors differ from viscous damped motors in that the permanent magnet stator of the drag-cup generator is now mounted in its own bearings, either in the motor shaft or on a separate aligned shaft, forming a high-inertia flywheel. This means that, whereas the motor rotor always experiences a viscous damping in viscous-damped servomotors, in inertial-damped servomotors the drag cup motor rotor only experiences a viscous damping while accelerating the flywheel, with the damping torque always opposing any change in rotor speed. Once the flywheel rotates synchronously with the rotor, all damping ceases. Note that this viscous damping is carried out via the coupling of the drag-cup generator rotor, rigidly affixed to the motor rotor, to the PM flywheel, so that their relative motion generates the viscous torque proportional to the relative velocity. Use of drag-cup sleeve rotors in inertially damped servomotors was largely supplanted by squirrel cage rotors once the latter became produced as cast alloy rotors. Since inertially damped motors can be used in open and closed-loop servo applications, and present better stability—even in the presence of nonlinearities—and higher velocity characteristics than other induction motors do (Diamond, A (1965) "Inertially damped servo motors, performance analysis", Electro-Technology, 7:28–32.), they have been employed in antenna tracking systems, stable inertial-guidance platforms, analog to digital converters, tachometers and torque tables. The typical operation of an inertially damped servomotor is as follows: with the reference phase fully excited, the motor rotor—fixedly linked to the generator rotor, as well as the flywheel, remain immobile; once power is applied to the control phase, the motor rotor immediately responds but the flywheel remains at rest. However, as the drag-cup generator 62 is forced to move through the permanent magnetic field of the flywheel, it creates a drag torque that slows down the attached motor rotor proportionally to the acceleration that it imparts to the flywheel that it now sets into motion, thus creating the viscous damper. As the flywheel accelerates, the relative speed of the motor with respect to the flywheel, as well as the damping torque, decrease until both motor and flywheel rotate synchronously and no damping torque is exercised—at which point the drag on the motor cup exerted by the generator cup is negligible. The KS-9303 motor is an inertial damped servomotor but is differentiated with respect to other inertially damped motors, in that (1) it employs a drag-cup sleeve motor rotor made of aluminum, very much like that of the KS-8624, but with slightly altered dimensions and with a shaft extension for the drag-cup copper generator rotor, and (2) the moving flywheel structure was journalled on a separate, fixed shaft, as already described with reference to FIG. 18. Now, in principle, even application of minimal damping decreases motor efficiency, resulting in diminished torque and speed. Whether the inertial-damped motor has a drag-cup rotor, a sleeve rotor or a squirrel cage rotor, the damping increases the rotor slip. Laithwaite considers drag-cup motors as being "dynamically inferior to their cage counterparts" (Laithwaite, ER (1957) "Induction machines for special purposes", London, England, p. 323.). If we now add a viscous damping and retarding torque, we should not be able to get much more than a 55% efficiency in the best of conditions. On the other hand, the inertial damping arrangement described will only abstract or supply energy when the motor rotor is accelerating or decelerating relative to the flywheel.

These drag-cup motors, whether inertially damped or not, develop a constant torque at constant rpm for a given supply frequency and a suitable phase shift capacitance. For each frequency the motors respond to, there is an optimum resonant split-phase capacitance, but other values nearby are still suited for operation, and for each value of capacitance, there is an optimal frequency the motors respond to. For example the KS-8624 motor responds best at 450 Hz when a 1 µF capacitance is employed, responds best at 250 Hz when a capacitance of 10 µF is employed, and responds best at 60 Hz, when a capacitance of 100 µF is employed. As the capacitance increases, the resonant CW frequency of the motor is displaced to lower values. If we fix the capacitance at a value (e.g. 10 µF) suitable for testing the frequency response at a fixed voltage of 12 VAC, the observed result for both the KS-8624 and KS-9303 motors show a response distribution of the motor rotary velocity that has an identical peak at 250 Hz for both motors, with the response decreasing to zero smoothly on both sides of the peak. These results indicate that, when wired as a split-phase motor, the motor rotary velocity varies not as a function of voltage or current, but as a function of frequency when the phase-splitting capacitance is fixed within a suitable range, there being an optimal frequency mode for each value of suitable capacitance, with lower values of capacitance favouring higher frequency modes. For a given frequency and capacitance, the motor rotary velocity remains essentially constant and independent from voltage and current input, and thus at a plateau. Torque, in the same circuit arrangement, follows exactly the same pattern as rotary velocity, as a function of input frequency at a fixed potential. Torque is linearly proportional to rpm in these motors when they are split-phase wired, and rpm linearly proportional to CW frequency, which makes them ideal for experimentation and determination of power output computations. Moreover, since these are drag machines, the slip itself determines the rotor currents and these are susceptible of tuning such that their retardation and relative position in the field can find resonant modes for varying CW frequency and capacitance.

In the circuit of FIG. 17 when using the KS 9303 motor, the inertial damping of the flywheel coupling retards the motor rotor currents sufficiently to allow them to build up torque, with the entire motor assembly serving as the preferred sink for all of the energy, massfree and massbound, captured by the receiving coil circuit with a drawing action established by the motor on the circuit, and providing satisfactory absorption by an inertial damper of the combined, synchronized, damped wave impulses, those occurring at a low frequency as a result of the firing of the PAGD reactor, and those occurring at a higher superimposed frequency—sourced in the transmitter circuit and picked-up by the receiver plate and coil. The action of each DW impulse train itself comports two different events, the DC-like auto-electronic-like discontinuity that sets the motor into action and initiates the rotor currents, and the AC-like damped wavetrain that supports the consistency of those rotors. The concentration of current required to kickstart the motor is provided by the DW impulses of the PAGD reactor, whereas, once the motor is in motion, and particularly, once it is stabilized by the flywheel, the cumulative action of the higher frequency DW impulses makes itself felt by accelerating the rotor to an optimum rotary velocity.

Figure 19:
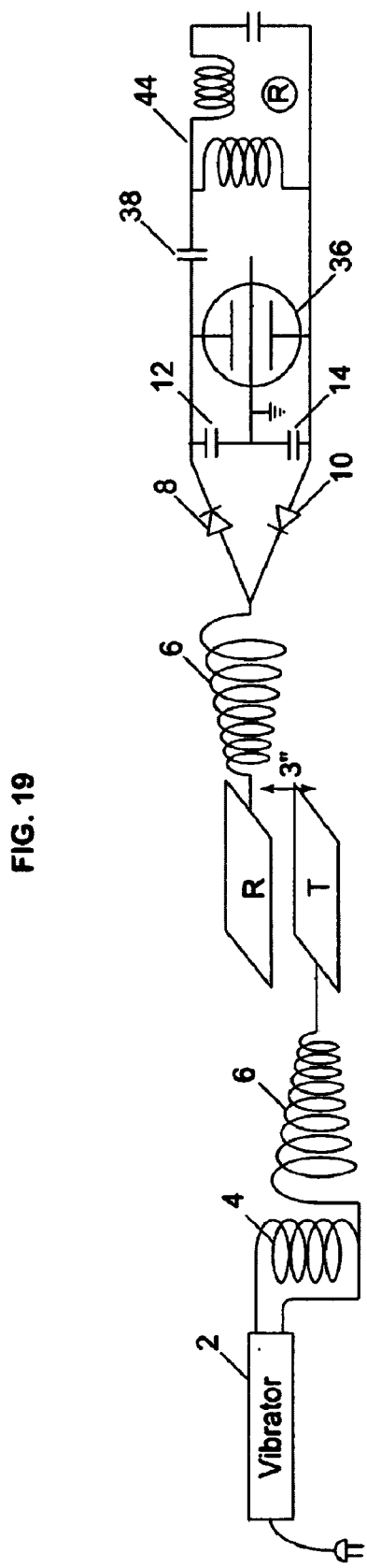
FIG. 19 is a schematic diagram of a further embodiment of energy conversion device incorporating such a motor.

For the next series of tests we employed the basic circuit diagram of the improved motor shown in FIG. 19. The transmission station is the typical Tesla transmitter with a line-fed, 60 Hz vibrator stage. At the line input to the first stage, we place a calibrated AC wattmeter (Weston Model 432), and a Beckman 330B rms ammeter in series with the hot lead, we set the vibrator stage for 41 clicks, consuming between 28.5 and 35 W, as depending upon circumstances yet to be narrated. This consumption was confirmed by driving the coil from an inverter powered by a 12 volt battery. The inverter consumes 2.16 watts, and is 90% efficient. The total consumption from the battery was 42 watts (12V at 3.5 A); once the 2.16 watts is deducted and the efficiency taken into account, we obtain the same 36 W (vibrator stage at max, i.e. 47 clicks, in this experiment). The T/R gap is adjusted to 3", and 2 square ft plates are employed. Transmitter and receiver coils are tuned, and so are the plate capacitances, to 250 kHz, also the capacitances of the Function Y circuit connected at the output of the receiving coil. The rectified voltage and current generated by the transmitter secondary and by the transmitter plate was ascertained with a coil-tuned wave-divider (Function Y) circuit by loading it with different resistive values. The results constitute a measure of the massbound electrical power output directly from the transmitter apparatus. The same method was employed to ascertain the voltage, current and power of the massbound charges circulating in the receiving plate and coil circuit. The results are shown in Table 8 below:

TABLE 8

Massbound currents rectified by Function Y at the output of the Tesla transmitter, transmitter plate and receiver plate, as a function of the bleeding resistance employed in each of the function Y arms

|  | VDC (kilovolts) | ADC (amp) | WDC (watts) | R/arm (Mohm) |
|---|---|---|---|---|
| Direct from 20° | 42–50 | $3*10^{-5}$ | 1.26–1.5 | 500 |
| From 2° (T) plate | 26 | $2*10^{-5}$ | 0.52 | 500 |
| From 2° (R) plate | 15.1 | $1.25*10^{-5}$ | 0.189 | 500 |
| Direct from 2° | 20.4 | $3.4*10^{-4}$ | 6.936 | 50 |
| From 2° (T) plate | 15.2 | $2.4*10^{-4}$ | 3.648 | 50 |
| From 2° (R) plate | 9 | $1.2*10^{-4}$ | 1.08 | 50 |
| Direct from 2° | 3.3 | $1.75*10^{-3}$ | 5.775 | 1 |
| From 2° (T) plate | 3.5 | $2*10^{-3}$ | 7.0 | 1 |
| From 2° (R) plate | 2.95 | $1.6*10^{-3}$ | 4.72 | 1 |

The results indicate that the highest massbound power assembled by the secondary transmitter circuit does not exceed 7 watts—and this is directly output from the secondary 26 when the load is 50 Mohm, or from the transmitter plate when the load is 1 Mohm. The massbound electric power emulated by the receiving circuit (plate, coil and Function Y without the plasma pulser circuitry) never exceeds the massbound electric power output directly by the transmitter, and peaks when the resistive load value (1 Mohm) approaches the pre-breakdown resistance range of the vacuum tube, at 4.72 W. These findings then indicate that when the transmitter circuit is consuming a maximum of 35 W, a typical output from the secondary of the transmitter is 7 W, and at 3" of distance within the proximal field of the latter, the pick-up by a tuned receiver will be on the order of 5 W of massbound current duplicated within the receiving coil. The loss in the first stage is therefore on the order of sevenfold. Continuing with the description of the circuit of FIG. 19, a 128 cm² plate area, 6 cm gap PAGD reactor is employed, connected as described in our prior art to a high-vacuum rotary pump (Correa, P & Correa, A (1995) "Energy conversion system", USPTO U.S. Pat. No. 5,449,989.). Pressure readings were obtained with a thermocouple gauge during the operational runs. The KS-9303 motors to be tested are then connected to the PAGD reactor in the usual capacitatively-coupled, inverter fashion described in our prior art (Correa, P & Correa, A (1995) "Electromechanical transduction of plasma pulses", USPTO U.S. Pat. No. 5,416,391.). Their rpm is detected by a stroboscopic tachometer and fed to a Mac Performa 6400 running a motor algorithm program calculating the power output. Motor measurements were made at five minutes into each run for the unloaded motors, and at ten minutes for the inertially damped motors. All experiments were carried out in the same work session. The experimental determination of the continuous rotary power output as a function of the reactor pulse rate confirmed that the improved circuit develops maximum rotary capture of the massfree energy in the receiver circuit at the lowest rates of pulsation, just as we have previously found for the conversion system of U.S. Pat. No. 5,449,989. Furthermore, the data showed that even motors of type KS-8624 are able to output power mechanically in excess of the massbound power output by the transmitter (7 W) or captured by the receiver (5 to a max of 7 W), once the PAGD rate decreases to 1.5 PPS. Such an anomaly can only be explained by the system having become able to begin capturing the massfree energy flux in the receiver circuit that we know already is output by the transmitter circuit. But this excess mechanical power is still, and clearly so, less than the power input into the transmitter. It represents a power gain with respect to the secondary, but a loss with respect to the primary. The full breadth of the capture of the massfree electric energy flux circulating in the receiver circuit is not seen until the motors are resonantly loaded because they are inertially damped.

The KS-9303 motors, once inertially damped, and thus loaded, are able to to recover enough power from the massfree energy field to develop a mechanical power, not just greatly in excess of the massbound power of the secondary, but also greatly in excess of the massbound power input to the vibrator stage and the primary, at 28 to 35 W. Once the pulse rate approaches the same 1.5 PPS marker, mechanical power in excess of the massbound electric power input to the primary becomes evident, peaking at nearly three times that input. In fact, the highest output recorded was also obtained with the lowest input to the transmitter circuit, the highest exact coefficient observed in this experiment being 100.8 W/28 W=3.6. Furthermore, with respect to the secondary massbound output, the same mechanical rotary output represents a much greater overunity coefficient of performance, on the order of 14.4 times greater. This is at least partly the result of the receiver and motor capture of the massfree electric energy output by the transmitter, and may be partly the result of massfree energy engrafted by the PAGD regime in the PAGD reactor. Reviewing the mechanical power output results as a function of increasing vacuum in the PAGD reactor and at different output power levels, any motor performance below the 5–7 W limit of the traditional massbound output power of the secondary represents an output mechanical power loss with respect to both the massbound secondary output and the massbound primary input. All the results for pressures down to 0.03 Torr fall in this category, and thus represent a very inefficient coupling to the PAGD regime. Any motor performance between 7 W and 28–35 W represent a loss with respect to the electrical power input to the transmitter system, but a net gain of power with respect to the massbound secondary power output. None of the non-inertially damped motors tested were able to perform outside of this area, under the test conditions. With more efficient primary to secondary couplings in the transmitter station, however, one could advantageously employ these motors alone to extract some of the massfree power of the secondary or to operate them in enclosed vessels without conventional external electrical connections. To reach satisfactory levels of recovery of massfree energy, one must dampen the superimposed DW impulses. Hence, all results showing outputs in excess of 35 W were obtained using the inertially damped KS-9303 motors, and represent a net overunity power gain over both the power input to the primary and the massbound power output by the secondary, or the massbound power emulated by the receiver circuitry. This happens when the PAGD pulse rate falls to 2 PPS, with the rotary power output steeply increasing as the rate falls to 1 PPS.

One of the interesting features of the motor circuitry we have proposed is that it can operate with pulsed plasmas in both the TRD and the AGD regions, the least efficient response occurring in the NGD region near the Paschen minimum. One might think that the voltage depression would allow increased current intensity supplied to the motors, but in fact that is not observed, with the flashing of the NGD yielding erratic oscillations and low values of current. In keeping with the notion that the TRD plasma is mainly composed of lagging positive ions, whereas the PAGD plasma is mostly an electron plasma, the observed direction of rotation of the motors is opposite in the TRD region to that of the AGD region. The NGD region therefore marks the depression where the velocity vectors change direction. In the second or PAGD region, motor operation is very quiet, unlike what is observed in the TRD region.

Part and parcel of the tuning of the circuit components is the selection of the optimum capacitances employed to couple the PAGD reactor to the motor circuit and split the phase to feed the auxiliary winding of the motor. We have experimented with capacitances ranging from 0.5 to 100 μF, and found that best results—for the specific circuit in question (including the characteristics of the transmission)—were such that the optimal value of the PAGD coupling capacitance lay near 4 pF, and the phase splitting capacitance, near 1 to 4 μF, depending upon weather conditions—in good weather days lower capacitance values can be implemented, and in bad weather days higher capacitances are needed. For ease of comparison in demonstrating the need to tune the circuit by employing optimal capacitances in those two couplings (reactor to motor, and motor phase coupling), we employed the same capacitances in both circuit locations. A comparison of tests using 1 and 4 μF values shows the difference caused by changing those capacitances from their optimal value: across all discharge regions of the pressure range that was examined, the four motors tested operating with greater motor speeds when the capacitances are set to 4 μF rather than to 1 μF. The less efficient performance obtained with 1 μF capacitances fits the inverse correlation of pulse power with increasing pulse frequency, such as we have found for the PAGD regime. This is made evident by a comparison of rpm versus pulse rate for the two capacitance values being considered. They demonstrate the higher pulse rates observed with the lower capacitance, that correlate with the slower motor speeds, and result in lower efficiency of the motor response. The results equally indicate that low capacitance values increase the pulse rate, but if this increase is out of tune with the rest of the circuit values, it results in power waste because it imposes a rate that is not optimal.

We have also experimentally determined that the efficiency of the system is affected by external weather conditions, higher efficiencies being noted on a fine bright day than under poor weather conditions even though the apparatus is not exposed to such conditions. This may reflect a diminution under poor weather conditions of latent massfree energy that can be taken up by the system.

The observed high efficiency of circuits including inertially damped motors indicates that the phenomenon does not reduce to a mere optimal capture of DC-like pulses produced by the reactor in what is essentially an AC motor circuit. Effectively, the pulsed plasma discharge deploys a front-end, DC-like pulse, or discontinuity, but this is followed by an AC-like damped wave of a characteristic frequency (having a half-cycle periodicity identical to that of the front-end pulse) to which the motor circuit also responds. Moreover, the massfree electric radiation from the transmitter circuit itself induces—in the receiver antenna, coil and circuit, and in the reactor discharge itself—the train of finer damped wave impulses responsible, after conversion through the wave-divider, for the massbound rectified current that is employed to charge the plasma reactor to begin with. Serving as trigger of the plasma discharges in the reactor are the DW impulses circulating in the receiver circuit, such that the two different lines of DW impulses, in the receiver circuit (for example 120 PPS for the pulses and 154 kHz for the waves) and from the reactor, are synchronized by interpolated coincidences, since their pulse and wave frequencies are different. Ideally, these two superimposed DW frequencies are harmonics or made identical. The receiver stage involves capture of the massfree electric energy received from the transmitter, duplication of the massbound current in the receiver coil, and injection of latent and sensible thermal energy in the T/R gap cavity that augments the emulated massbound current. The massbound current is employed to charge the wave-divider capacitance bridge and therefore the reactor. In turn, the plasma pulses from the reactor are superimposed with the DW impulses from the receiving coil, and together they are coupled to the split-phase motor drive. Hence the first receiver stage employs the totality of the energy captured in the T/R gap cavity-massfree electric energy transmitted by the T plate, latent and sensible thermal energy injected at the surface of the R plate—and produces in the receiving coil a massbound current comparable to that assembled in the transmitter coil by the action of the primary. The massbound current is stored in the wave-divider bridge and used to drive the plasma reactor in the PAGD region. Subsequently, the autogenous disruptive discharge that employs a substantial electron plasma generates both a concentrated, intense flux of massbound charges in the output circuit, and a massfree oscillation of its own. The damped motor is therefore fed directly with (1) the intense massbound current output from the reactor; (2) the pulse and wave components of the massfree electric energy captured by the receiver plate and coil (and matched by conduction through the earth), and which are gated through the wave-divider and the reactor for the duration of the PAGD channel; and (3) any massfree latent energy taken up from the vacuum by the PAGD event. Once the motor is set into motion, and is resonantly loaded with an inertial damper, we believe that it will also respond to the much weaker DW impulses captured by the receiver, since these impulses encompass both a DC-like front end— further enhanced by analytic separation through the wave-divider—and a damped wave at 154 kHz. Essentially the DW impulses that are ultimately sourced in the transmitter -and received unipolarly through the T/R gap— have sufficient DC-like potential (plus all the other requisite physical characteristics, such as frequency) to contribute directly to the motor response, once the motor has gained substantial speed (for they lack the current to set it into motion, one of the contributions from the plasma pulser). This is the case, provided that the motor itself is suited for absorption of both DC-like pulses and AC-like damped waves, which is precisely the case with motors of the type shown in FIG. 18 since the inertia of the flywheel is overcome through homopolar absorption of the damped oscillations simultaneously in the motor drag-cup rotor and in the generator drag-cup rotor.

We also tested these inertially damped motors in the traditional DC power supply-driven PAGD circuit we have taught in our previous patents, that is, circuits with an overt HV DC power source, and thus in the absence of any Function Y circuit or transmitter circuit. Here then, only the DW impulses generated by the PAGD reactor can account for the motor response. The tube employed (A31) had an area of 256 cm$^2$, and a gap distance of 4 cm. Coupling capacitances employed were 4 µF for the inverter coupling, and 1 µF for the split phase motor coupling. The DC power supply delivered up to 1 ampere of current between 150 and 1,000 VDC, and the ballast resistor was adjusted to 215 ohms. Having determined the basic physical characteristics of the reactor's behaviour in the circuit under consideration, we conducted our experiment in the PAGD region. We chose a pressure of 0.6 Torr, just off from the Paschen minimum, as we intended to benefit from the lower sustaining voltage that it affords. The experiment basically consisted of increasing the sustaining voltage at this fixed pressure in the PAGD regime, and measuring the diverse physical parameters of the circuit and motor response in order to ultimately ascertain the difference between the input electric DC power and the output mechanical rotary power. We first looked at how the motor rpm response varied as a function of the sustaining voltage ($V_s$): the results illustrate the importance of starting close to the Paschen minimum in the pressure scale, since the KS-9303 motors reach plateau response (at 17,000 rpm) when the reactor output voltage nears 450V. Any further increase in potential is simply wasted. Likewise, the same happened when we measured motor speed as a function of increasing peak DC current, plateau response being reached at 0.1 ADC. Again, any further increase in current is wasted. Essentially then, the optimal power input to the reactor when the latter's output is coupled to the motor, lies around 45 watts. This is a typical expenditure in driving a PAGD reactor. As for pulse rate we once again find a motor response that is frequency proportional in the low frequency range, between 10 and 40 PPS (all pulse rates now refer solely to PAGDs per sec), but once rates of >40 PPS are reached, the response of the motor also reaches a plateau. The observed increment in speed from 40 to 60 PPS translates only into an increase of 1,000 RPM, from 16,000 to 17,000 RPM. So, we can place the optimal PAGD rate at ca 40 PPS. The DC electric power input to drive the PAGD reactor was next compared to the rotary mechanical power output by the inertially loaded motor, driven in turn by the reactor. This comparison was first carried out with respect to the PAGD rates. The motor response far exceeds the conventional input power, indicating that the whole system can be tuned to resonance such that optimal power capture inside the reactor takes place, the critical limit rate lying at around 60 PPS, when the motor response is firmly within the pulse response plateau. At this juncture, the break-even efficiency for the measured rates of energy flux over time reach 700% (overunity coefficient of 7), in keeping with the observations and the values we have made in the PAGD conversion system. In the proportional part of the curve, before the plateau is reached, even greater rates of break-even efficiency—up to >1,000% were registered. These results constitute the first time we have been able to confirm the presence of output energy in excess of break-even over conventional mass-bound energy input in the PAGD inverter system, and the results are comparable to what we have observed and previously reported for the PAGD converter system. At pulse rates greater than 60 PPS a greater input power results in decreased efficiency, also translated into a noticeable heating of the reactor and motor. And this is all the more remarkable as experiments we have conducted with inductive tuning of PAGD reactors, or employing PAGD reactors as replacements for the primaries of Tesla coil assemblies, and still, more recently, with the PAGD inverter circuit driving motors, have all shown that it is possible to operate these reactors with minimal mirroring and heating, preserving essentially the cold-cathode conditions and yet focusing the plasma column so that deposition on the insulator is negligible. It appears that above a certain threshold of optimal efficiency, surplus input energy is just dissipated thermally by both the reactor and the motors.

It should be understood that the above described embodiments are merely exemplary of our invention, and are, with the exception of the embodiments of FIGS. 16–19 designed primarily to verify aspects of the basis of the invention. It should also be understood that in each of these embodiments, the transmitter portion may be omitted if an external or natural source of Tesla waves is available, provided that the receiver is tuned to the massfree radiation mode of the source. For example if solar radiation is available in which the massfree component has not interacted with the earth's atmosphere (as in space applications), the receiver is tuned to the voltage wave of the massfree radiation sourced in the sun, e.g. by using a Tesla coil in the receiver constructed to have an appropriate voltage wave close to the 51.1 kV characteristic of such radiation.

We claim:

1. A device for the conversion of massfree radiation into electrical or electrokinetic energy comprising a transmitter of massfree electrical radiation having a damped wave component, a receiver of such radiation tuned to resonance with the damped wave frequency of the transmitter, a co-resonant output circuit coupled into and extracting electrical or electrokinetic energy from the receiver, and at least one of a transmission cavity between the transmitter and the receiver, a full-wave rectifier in the co-resonant output circuit, and an oscillatory pulsed glow discharge device incorporated in the co-resonant output circuit.

2. A device according to claim 1, wherein the output circuit comprises a full wave rectifier presenting a capacitance to the receiver.

3. A device according to claim 2, wherein the output circuit comprises an electric motor presenting inductance to the receiver.

4. A device according to claim 3, wherein the motor is a split phase motor.

5. A device according to claim 4, wherein the motor is a drag motor having a non-magnetic conductive rotor.

6. A device according to claim 5, wherein the motor has inertial damping.

7. A device according to claim 6, wherein the motor has a shaft, a drag cup rotor on the shaft, and inertial damping is provided by a further drag cup on the shaft.

8. A device according to claim 6, wherein the transmitter and receiver each comprise at least one of a Tesla coil and an autogenous pulsed abnormal glow discharge device.

9. A device according to claim 8, wherein the transmitter and receiver both comprise Tesla coils, and further including a transmission cavity which comprises spaced plates connected respectively to the distal poles of the secondaries of Tesla coils incorporated in the transmitter and receiver respectively.

10. A device according to claim 9, wherein the plates are parallel.

11. A device according to claim 9, wherein the plates are concentric.

12. A device according to claim 9, wherein at least the receiver comprises a Tesla coil driving a plasma reactor operating In PAGD (pulsed abnormal glow discharge) mode.

13. A device according to claim 12, wherein the transmitter and receiver both comprise Tesla coils, and further Including a transmission cavity which comprises spaced plates connected respectively to the distal poles of the secondaries of Tesla coils incorporated in the transmitter and receiver respectively.

14. A device according to claim 1, wherein the transmitter and receiver each comprise at least one of a Tesla coil and an autogenous pulsed abnormal glow discharge device.

15. A device according to claim 1 wherein a transmitter/receiver cavity is present and filled with an aqueous liquid.

16. A device for the conversion of massfree radiation into electrical or electrokinetic energy comprising a receiver of such radiation from a source of massfree electrical radiation having a damped wave component, the receiver being tuned to resonance with the damped wave frequency of the source, a co-resonant output circuit coupled into and extracting electrical or electrokinetic energy from the receiver, and at least one of a transmission cavity between the source and the receiver, a full-wave rectifier in the co-resonant output circuit, and an oscillatory pulsed glow discharge device incorporated in the co-resonant output circuit.

* * * * *